(12) United States Patent
Lumpkin

(10) Patent No.: US 7,617,913 B2
(45) Date of Patent: *Nov. 17, 2009

(54) METHOD OF VARYING A REST POSITION AND A LENGTH OF AN ACTUATION ARC OF A LEVER IN A HYDRAULIC DISC BRAKE SYSTEM

(75) Inventor: Wayne R Lumpkin, Littleton, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/147,272

(22) Filed: Jun. 26, 2008

(65) Prior Publication Data

US 2009/0000878 A1    Jan. 1, 2009

Related U.S. Application Data

(63) Continuation of application No. 11/552,458, filed on Oct. 24, 2006, now Pat. No. 7,575,105, which is a continuation of application No. 10/966,737, filed on Oct. 15, 2004, now Pat. No. 7,178,646, which is a continuation of application No. 10/316,452, filed on Dec. 10, 2002, now abandoned.

(60) Provisional application No. 60/344,450, filed on Dec. 28, 2001, provisional application No. 60/416,130, filed on Oct. 4, 2002, provisional application No. 60/416,698, filed on Oct. 7, 2002.

(51) Int. Cl.
*B62L 3/02* (2006.01)
*F15B 7/08* (2006.01)

(52) U.S. Cl. .................. 188/24.22; 188/344; 60/594

(58) Field of Classification Search ............ 188/24.11, 188/24.12, 24.22, 26, 344; 60/594
See application file for complete search history.

(56) References Cited

U.S. PATENT DOCUMENTS 2,213,947 A   9/1940   Bowen (Continued)

FOREIGN PATENT DOCUMENTS

DE   857901   12/1952

(Continued)

OTHER PUBLICATIONS

Communication pursuant to Article 96(2) EPC, dated Feb. 18, 2004 in EP Application No. 02 080 490.2.

(Continued)

*Primary Examiner*—Thomas J Williams
(74) *Attorney, Agent, or Firm*—Swanson & Bratschun, L.L.C.

(57) ABSTRACT

A method of varying a rest position and a length of an actuation arc of a lever in a hydraulic disc brake system. The hydraulic disc brake system comprises a master cylinder including a cylinder having a first end and second end and a port communicating with a hydraulic fluid reservoir between the first and the second cylinder ends. A piston is received in the cylinder. The piston has a seal between the cylinder and the piston and the piston is movable within the cylinder by a lever operatively associated therewith to selectively pressurize hydraulic fluid within the cylinder by moving the seal between the port and the second end of the cylinder. The hydraulic disc brake system further comprises a caliper in fluid communication with the master cylinder. The caliper has a pair of brake pads operatively associated with a disc received therebetween. The caliper is actuated by movement of the lever in an actuation arc between a rest position and an engagement point with the pads in engagement with the disc. The length of the actuation arc is variable by movement of the engagement point relative to the rest position along the actuation arc. The method comprises varying a rest position of the lever while simultaneously substantially maintaining the length of the actuation arc as the rest position of the lever is varied and varying the length of the actuation arc while simultaneously substantially maintaining the rest position of the lever and limiting any movement of the piston seal to between the port and the first end of the cylinder as the length of the actuation arc is varied.

1 Claim, 23 Drawing Sheets

U.S. PATENT DOCUMENTS

| | | | |
|---|---|---|---|
| 2,952,128 | A | 9/1960 | Highland |
| 2,958,198 | A | 11/1960 | Moyer |
| 3,348,377 | A | 10/1967 | Freeman |
| 3,802,200 | A | 4/1974 | Kolm |
| 4,004,707 | A | 1/1977 | Snyder |
| 4,388,944 | A | 6/1983 | Honma |
| 4,501,340 | A | 2/1985 | Yoshida |
| 4,542,624 | A | 9/1985 | Mizusaki |
| 4,560,049 | A | 12/1985 | Uchibaba |
| 4,568,131 | A | 2/1986 | Blomberg |
| 4,626,045 | A | 12/1986 | Takei |
| 4,635,442 | A | 1/1987 | Bass |
| 4,779,482 | A | 10/1988 | Kawaguchi |
| 4,785,629 | A | 11/1988 | Ennis, III |
| 4,788,821 | A | 12/1988 | Mienko |
| 4,840,082 | A | 6/1989 | Terashima |
| 4,878,346 | A | 11/1989 | Metzelfeld |
| 4,921,081 | A | 5/1990 | Chilcote |
| 5,050,381 | A | 9/1991 | Matsuno et al. |
| 5,205,153 | A | 4/1993 | Hlavinka |
| 5,287,765 | A | 2/1994 | Scura |
| 5,620,575 | A | 4/1997 | Karasawa |
| 5,632,362 | A | 5/1997 | Leitner |
| 5,636,518 | A | 6/1997 | Burgoyne et al. |
| 5,660,082 | A | 8/1997 | Hsieh |
| 5,813,501 | A | 9/1998 | Terry, Sr. et al. |
| 5,931,349 | A | 8/1999 | Yoo |
| 5,950,772 | A | 9/1999 | Buckley |
| 6,003,639 | A | 12/1999 | Buckley |
| 6,085,523 | A | 7/2000 | Buckley |
| 6,269,638 | B1 | 8/2001 | Murata |
| 6,318,514 | B1 | 11/2001 | Hinkens |
| 6,321,784 | B1 | 11/2001 | Leng |
| 6,334,514 | B1 | 1/2002 | Kirimoto et al. |
| 6,336,327 | B1 | 1/2002 | Noro |
| 6,336,960 | B1 | 1/2002 | Marinaro |
| 6,347,689 | B1 | 2/2002 | Ohishi |
| 6,349,800 | B1 | 2/2002 | Nakamura |
| 6,370,877 | B1 | 4/2002 | Lin |
| 6,443,027 | B1 | 9/2002 | Cheever |
| 6,457,378 | B2 | 10/2002 | Hatakoshi |
| 6,491,144 | B2 | 12/2002 | Veda |
| 6,502,675 | B1 | 1/2003 | Andrus |
| 6,516,682 | B2 | 2/2003 | Brainard |
| 6,527,303 | B2 | 3/2003 | Kariyama |
| 6,658,844 | B1 | 12/2003 | Lammers |
| 6,804,961 | B2 | 10/2004 | Lumpkin |
| 6,922,994 | B1 | 8/2005 | Lavezzi |
| 6,957,534 | B2 | 10/2005 | Lumpkin |
| RE38,975 | E | 2/2006 | Kirimoto et al. |
| D522,422 | S | 6/2006 | Campbell et al. |
| 7,178,646 | B2 | 2/2007 | Lumpkin |
| 7,204,350 | B2 | 4/2007 | Lumpkin |
| 7,222,703 | B2 | 5/2007 | Laghi |
| 7,249,661 | B2 | 7/2007 | Becocci |
| 7,308,791 | B2 | 12/2007 | Takizawa |
| 7,487,638 | B2 * | 2/2009 | Tetsuka et al. ............... 60/594 |
| 2005/0056508 | A1 | 3/2005 | Laghi |
| 2006/0070483 | A1 | 4/2006 | Dimsey |
| 2007/0051575 | A1 | 3/2007 | Lumpkin |
| 2007/0187191 | A1 | 8/2007 | Lumpkin |
| 2007/0284203 | A1 | 12/2007 | Tetsuka |
| 2008/0116025 | A1 | 5/2008 | Lumpkin |
| 2008/0245632 | A1 * | 10/2008 | Watarai et al. ............. 188/344 |

FOREIGN PATENT DOCUMENTS

| | | | |
|---|---|---|---|
| DE | 2922399 | | 12/1980 |
| DE | 3216885 | A1 | 11/1983 |
| DE | 4408741 | A1 * | 10/1994 |
| DE | 19718612 | | 11/1998 |
| DE | 19718612 | A1 | 11/1998 |
| DE | 20018705 | | 12/2000 |
| EP | 0405945 | A | 1/1991 |
| EP | 0893337 | A2 | 1/1999 |
| EP | 1160152 | A | 12/2001 |
| GB | 1536353 | | 12/1978 |
| GB | 2310696 | | 9/1997 |
| IT | 0218037 | | 3/1992 |
| JP | S62-1834 | | 1/1987 |
| JP | 2002 68067 | | 2/2002 |

OTHER PUBLICATIONS

Formula Evoluzione 9.5 Operating Manual, 2003, English Version, Autor: Formula, an Italian Corporation.

Formula 4Racing FR—4Racing DH Spare parts price list, 2002-2003 Original Spare Parts, English version, Author: Forumula, an Italian Corporation.

Magura Bicycle Product Internet Catalog, 2003, in particular, Gustav M brake lever; Marta brake lever; Louise_FR brake lever; Louise brake lever; Clara brake lever and Julie brake lever. Author: Magura USA, Inc.

Shimano Bicycle Product Internet Catalog, in particular XTR brake lever. Author: Shimano, Inc.

Shimano Bicycle Product Internet Catalog, 2003, in particular Deore brake lever. Author: Shimano, Inc.

* cited by examiner

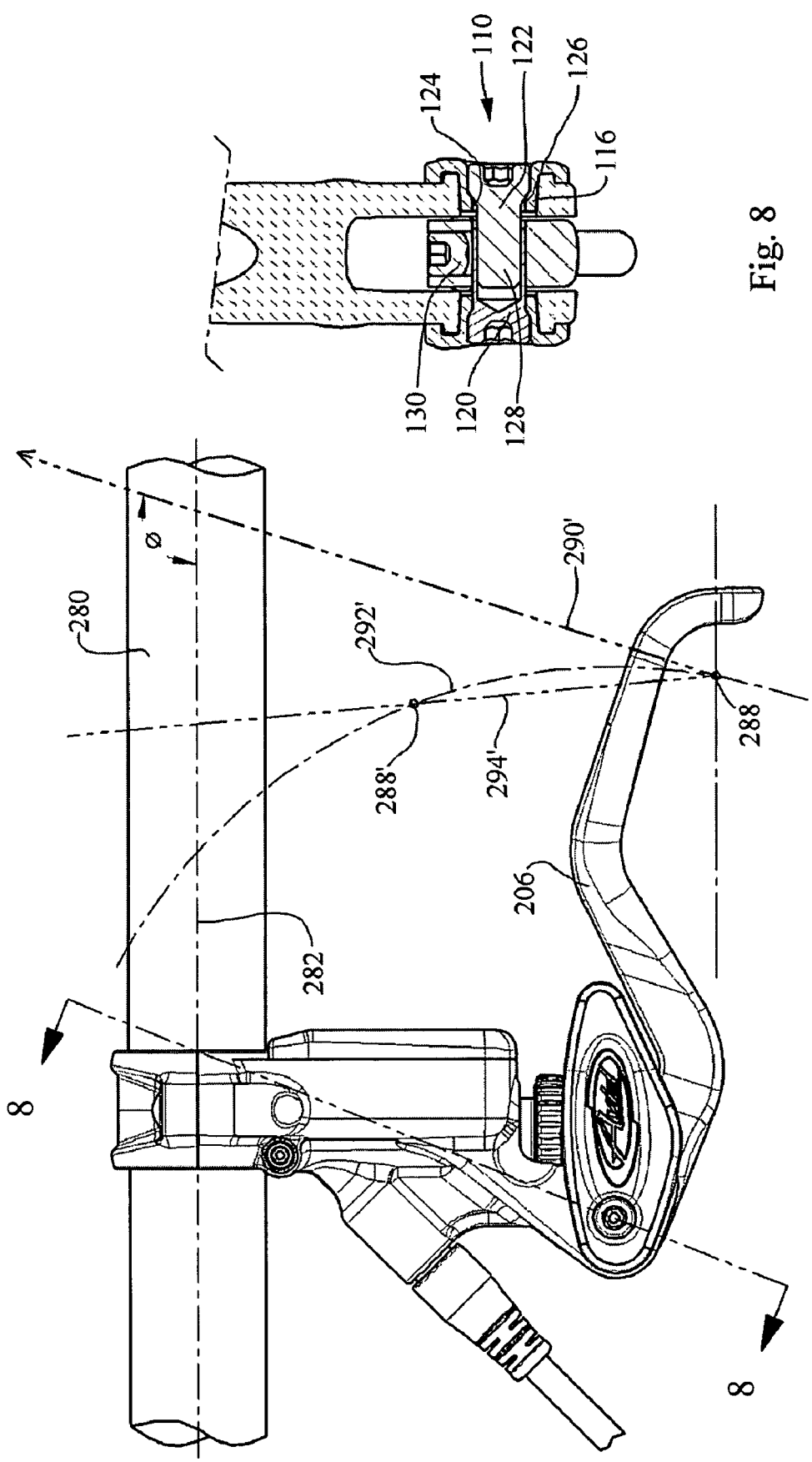

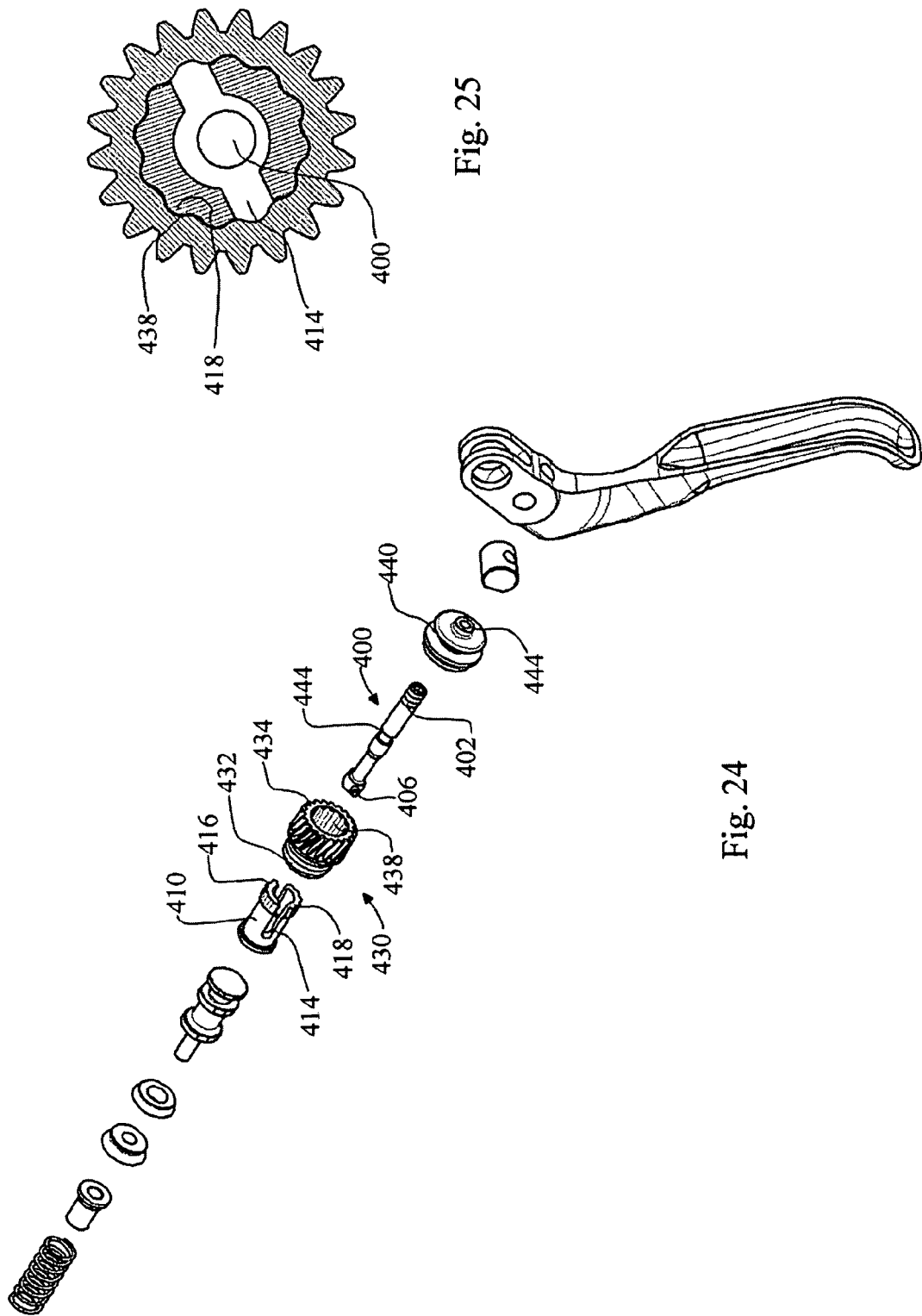

METHOD OF VARYING A REST POSITION AND A LENGTH OF AN ACTUATION ARC OF A LEVER IN A HYDRAULIC DISC BRAKE SYSTEM

RELATED APPLICATIONS

This application is a continuation of U.S. patent application Ser. No. 11/552,458, filed Oct. 24, 2006, entitled "Master Cylinder Lever with Independently Variable Rest Position and Engagement Point," which is a continuation of U.S. patent application Ser. No. 10/966,737, filed Oct. 15, 2004, entitled "Master Cylinder Lever for a Hydraulic Disc Brake Having a Backpack Reservoir," now U.S. Pat. No. 7,178,646, which is a continuation of U.S. application Ser. No. 10/316,452, filed Dec. 10, 2002, entitled "Master Cylinder Lever for a Hydraulic Disk Brake Having a Backpack Reservoir", now abandoned, which application claims priority from U.S. Provisional Patent Application Ser. Nos. 60/344,450, filed Dec. 28, 2001; 60/416,130, filed Oct. 4, 2002; and 60/416,698, filed Oct. 7, 2002, each entitled "Master Cylinder Lever for Hydraulic Disc Brake."

TECHNICAL FIELD

The present invention is directed toward an improved master cylinder lever for a hydraulic disc brake, and more particularly to a master cylinder lever having a variable length of actuation arc and variable rest position that can be varied independently of each other.

SUMMARY OF THE INVENTION

A method of varying a rest position and a length of an actuation arc of a lever in a hydraulic disc brake system. The hydraulic disc brake system comprises a master cylinder including a cylinder having a first end and second end and a port communicating with a hydraulic fluid reservoir between the first and the second cylinder ends. A piston is received in the cylinder. The piston has a seal between the cylinder and the piston and the piston is movable within the cylinder by a lever operatively associated therewith to selectively pressurize hydraulic fluid within the cylinder by moving the seal between the port and the second end of the cylinder. The hydraulic disc brake system further comprises a caliper in fluid communication with the master cylinder. The caliper has a pair of brake pads operatively associated with a disc received therebetween. The caliper is actuated by movement of the lever in an actuation arc between a rest position and an engagement point with the pads in engagement with the disc. The length of the actuation arc is variable by movement of the engagement point relative to the rest position along the actuation arc. The method comprises varying a rest position of the lever while simultaneously substantially maintaining the length of the actuation arc as the rest position of the lever is varied and varying the length of the actuation arc while simultaneously substantially maintaining the rest position of the lever and limiting any movement of the piston seal to between the port and the first end of the cylinder as the length of the actuation arc is varied.

BRIEF DESCRIPTION OF THE DRAWINGS

FIG. 7 is a side elevation view of the master cylinder lever of FIG. 1;

FIG. 8 is a cross-section of the master cylinder lever of FIG. 1 taken along line 8-8 of FIG. 7, illustrating an adjustable lever pivot assembly;

FIG. 24 is an exploded view of the lever of FIG. 23; and

FIG. 25 is a cross-section taken along line 25-25 of FIG. 23.

DETAILED DESCRIPTION OF THE PREFERRED EMBODIMENT

Figure 1:
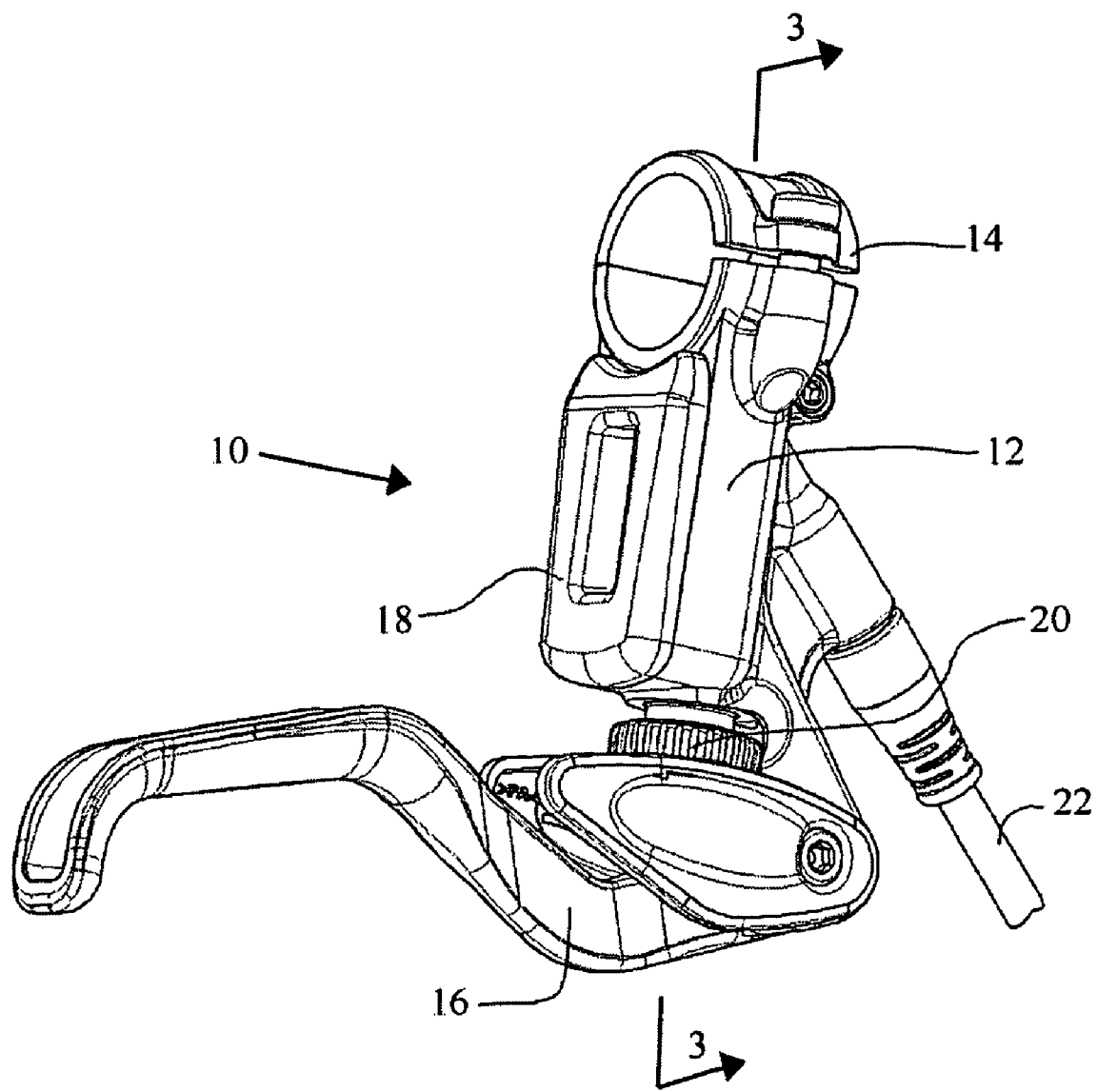
FIG. 1 is a perspective view of a first embodiment of a master cylinder lever for a hydraulic disc brake in accordance with the present invention.

A first embodiment of master cylinder lever assembly 10 is illustrated in a perspective view in FIG. 1. The master cylinder lever assembly consists generally of a cylinder housing 12 having a bar clamp 14 at one end and a lever handle 16 pivotably attached at an opposite end. Also seen in FIG. 1 is a reservoir cover 18 which covers a "backpack" reservoir which will be described in greater detail below. Also visible in FIG. 1 is a contact point adjustment knob 20 which is also described in greater detail below. The master cylinder housing 12 is hydraulically connected to a slave cylinder which operates a hydraulic caliper (not shown) by hydraulic line 22.

Figure 2:
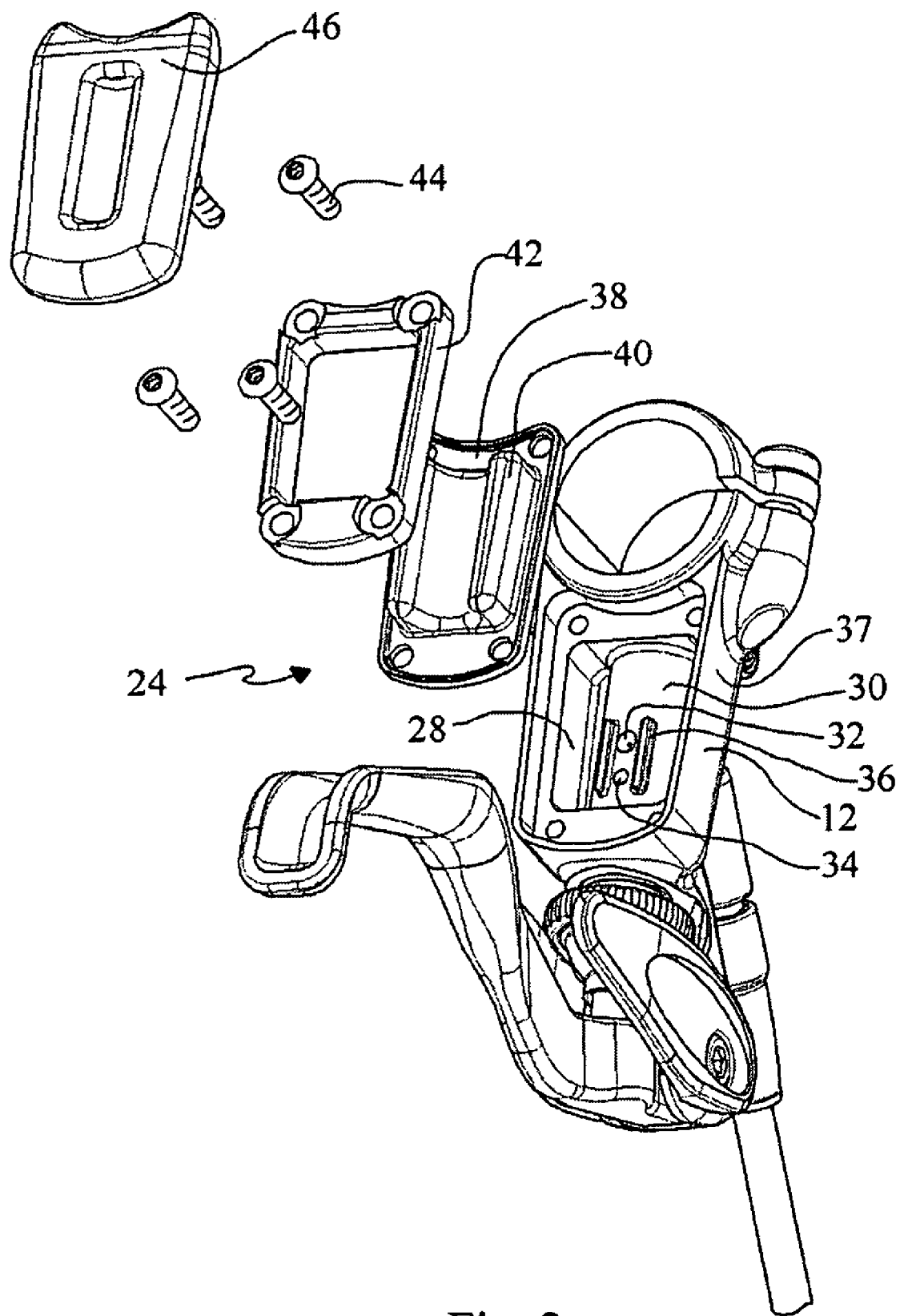
FIG. 2 is an exploded view of the backpack reservoir of the master cylinder lever of FIG. 1.

FIG. 2 is an exploded view of the "backpack" reservoir of the master cylinder lever of FIG. 1. The backpack reservoir consists of a reservoir chamber 28 defined in a rear facing portion of the master cylinder housing 12. A cylinder wall 30 defining in part the cylinder of the master cylinder housing 12 extends into the reservoir chamber 28 and defines in part a first wall 31. Extending through the cylinder wall between the reservoir chamber 28 and the master cylinder is a timing port 32 and a compensating port 34. A pair of bosses 36 extend axially of the cylinder wall 30 on opposite sides of the timing and compensating port 32, 34. A side wall 37 extends from the first wall. A diaphragm 38 made of an elastomeric material such as silicon rubber is made to overlay the side wall 37 and cover the reservoir chamber 28. Thus, the first wall 31, the side wall 37 and the diaphragm 38 define the reservoir chamber 28. The diaphragm 38 has an expansion protrusion 40 extending therefrom opposite the reservoir chamber. A reservoir frame 42 is configured to receive the periphery of the diaphragm 38 to maintain a tight seal between the diaphragm 38 and the reservoir chamber 28. This seal is promoted and the assembled relationship maintained by four screws 44 received in corner holes of the reservoir frame 42 and diaphragm 38 and threadably engaged with corresponding holes in the master cylinder housing 12. A vanity cover 46 snap fits over the diaphragm and frame to both provide an aesthetic appearance and to protect the diaphragm 38.

Locating the timing and compensating ports 32, 34 on the cylinder wall 30 as illustrated in FIG. 2 essentially eliminates the possibility of air entering either of the timing or compensating ports regardless of the position of the master cylinder. As should be apparent to one skilled in the art, this is because air will always rise and the curved surface of the cylinder wall always cause air bubbles to be deflected away from the timing and compensating ports regardless of the position of the master cylinder. While in the preferred embodiment illustrated herein, the cylinder wall 30 is truly cylindrical, it could also have other configurations such as a triangular configuration with the ports located at the apex of the triangle which would have the same affect of preventing air bubbles from collecting in the vicinity of the timing or compensating ports. Any other profile of the cylinder wall or location of the ports on the cylinder wall which prevents collecting of air bubbles in the vicinity of the timing and compensating ports is considered to be within the scope of the invention. The bosses 36 are provided to prevent the diaphragm 38 from covering and inadvertently sealing the compensation or timing ports as hydraulic fluid is drawn into the compensating and timing ports. As would be apparent to those skilled in the art, the bosses 36 could be replaced with similarly positioned posts or the like or other extensions to perform the same function of keeping the diaphragm spaced from the ports and such other configurations may have an additional advantage of minimizing the potential of air bubbles collecting in the vicinity of the ports. This structure facilitates a single lever being used on either a right or left portion of a handle bar without risk of bubbles entering the hydraulic fluid line.

Figure 3:
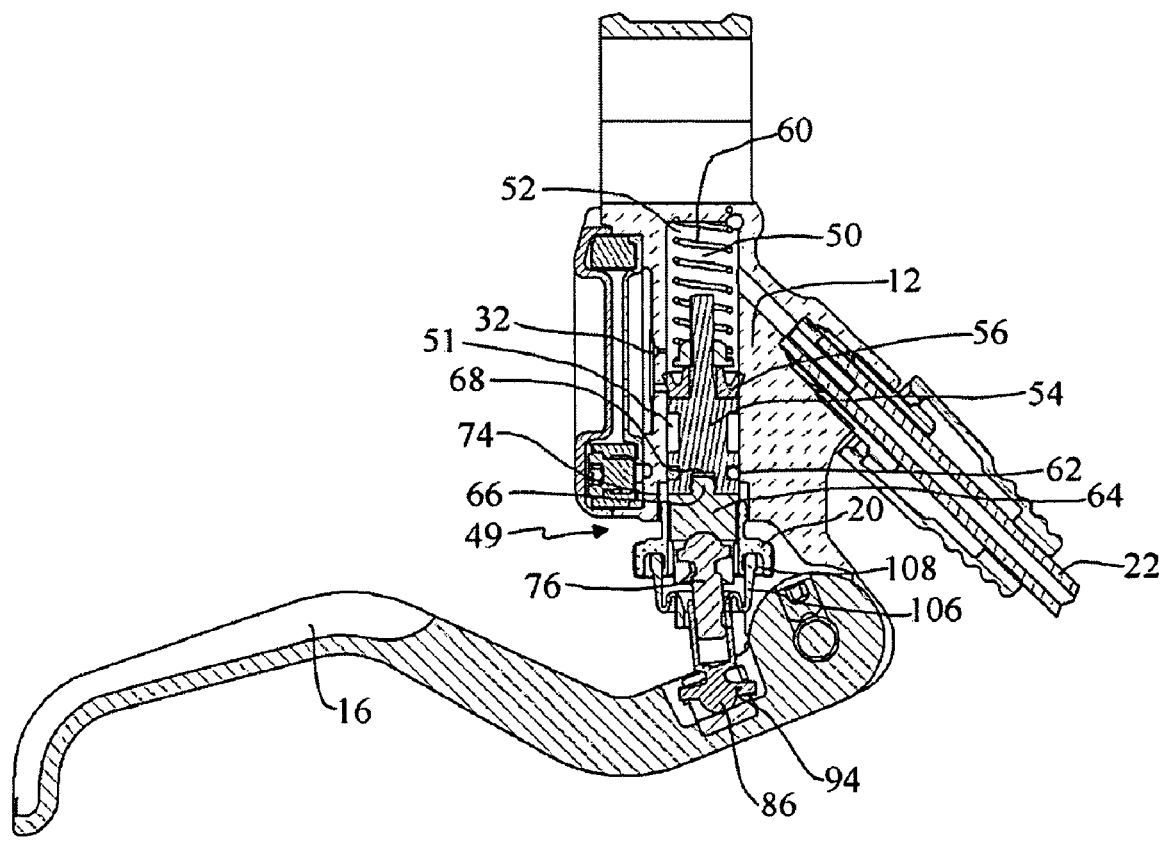
FIG. 3 is a cross-section of the master cylinder lever of FIG. 1 taken along line 3-3 of FIG. 1.
Figures 4, 5:
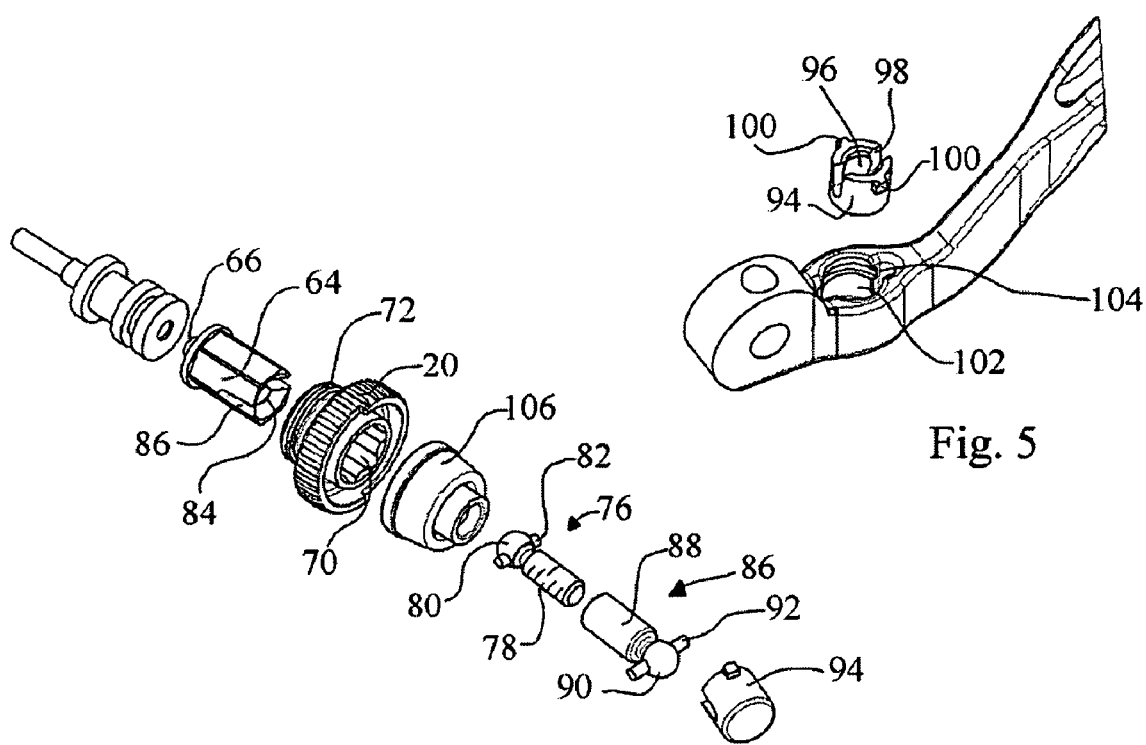
FIG. 4 is an exploded view of the piston train of the master cylinder lever of FIG. 1.
FIG. 5 is an exploded perspective view of a socket receptacle spaced from a lever handle of the master cylinder lever of FIG. 1.

FIG. 3, a cross-section of the master cylinder, illustrates the piston train 49 operatively associated with the cylinder 50 of the master cylinder housing 12. The cylinder 50 has a first end 51 and a second end 52. FIG. 4 illustrates the piston train 49 in an exploded view and the same reference numbers will be used to identify like elements in FIG. 3 and FIG. 4.

The piston train consists of a piston 54 received in the cylinder 50 having an annular cup or umbrella seal 56 abutting an internal portion of the piston 54. A compression spring 60 biases the piston 54 toward the first or open end of the cylinder 51. An "O" ring 62 forms a lower seal on the piston and is received within an annular recess in the piston. A hex spacer 64 has leading protrusion 66 with an annular detent that is snap fit into a corresponding female receptacle 68 in a trailing end of the piston 54. This snap fit allows for relative rotational movement between the piston and the hex spacer 64. The hex spacer 64 is in turn received in a hex hole 70 of contact point adjustment knob 20. The knob 20 also has a leading externally threaded extension 72 which threadably engages a countersink 74 concentric with and external of the cylinder 50. A male pushrod 76 having an externally threaded shaft 78 at its first end and a ball head 80 at its second end with posts 82 extending in opposite directions therefrom is snap fit received in a slotted socket 84 on an end opposite the protrusion 66 of the hex spacer 64 with the post 82 received in the slots 86, as best seen in FIG. 3. The male pushrod 76 in turn is threadably engaged with a female pushrod 86 having an internally threaded cylinder 88, again best viewed in FIG. 3. The female pushrod also includes a ball head 90 having oppositely extending posts 92. A socket insert 94 has a leading ball socket 96 with opposite slots 98 for snap fit receiving the ball head 90 with the posts 92 received in the corresponding slots 98. The socket insert 94 also includes locking posts 100. Referring to FIG. 5, these locking posts are received within a keyed orifice 102 in the lever handle 16 and then rotated 90° to lock the posts 100 in the annular slot 104. Referring back to FIG. 3, a dust cover 106, which is preferably elastomeric, is engaged in an annular slot 108 of the knob 20 with a nipple end receiving the female pushrod 86 as shown.

The basic operation of the master cylinder is well understood by those skilled in the art. Referring to FIG. 3, pivoting the lever handle 16 upward from a rest position toward the cylinder housing causes the piston train 50 to drive the piston upward within the cylinder. As the piston moves upward in the cylinder the cup or umbrella seal 56 covers the timing port 32 which pressurizes the fluid within the hydraulic line 22 at the second end of the cylinder and which in turn actuates a slave cylinder within a hydraulically coupled brake caliper (not shown). When the lever handle 16 is released, the compression spring 60 biases the piston toward the first end of the cylinder to reassume the position shown in FIG. 3. The distance between the cup seal 56 and the timing port 32 is referred to as the "dead-band." During the part of lever actuation where the cup seal is between the timing port 32 and the first end of the cylinder, fluid in the reservoir between the seal and the timing port returns to the reservoir chamber 30, perhaps causing expansion of the expansion protrusion 40 of the diaphragm 38. During this part of lever actuation, the second end of the cylinder cannot be pressurized. It is highly desirable to be able to adjust the length of the dead-band in accordance with user preferences. Rotation of the contact point adjustment knob 20 in a first direction allows for the dead-band to be taken up and reduced and rotation in a second direction increases the dead-band. In FIG. 3 a maximum dead-band is shown because the knob is almost fully threaded from the countersink 74. Threading the knob into the countersink causes the piston to move upward, thus reducing the dead-band. Obviously, the hex engagement between the hex spacer 64 and the knob 20 causes the hex spacer to rotate with the knob. However, the snap fit between the protrusion 66 and the female receptacle 68 of the piston prevents the piston from rotating relative to the knob, minimizing impairment of the seals.

One highly advantageous aspect of this design is that as the knob is screwed inward in the first direction, the male pushrod rotates axially because of engagement between the posts 82 and the hex spacer. The threads between the male pushrod 76 and the female pushrod 86 are configured to cause the male pushrod to extend further from the female pushrod as a result of this axial rotation in the first direction. The respective threads of the knob and the pushrods are designed such that the net result is that the lever handle does not move relative to the housing as the knob is turned. This feature has the important advantage of maintaining a preselected start position of the lever resulting reach between the lever and the handlebar as the dead-band of the master cylinder is adjusted.

In the event a user wishes to adjust the reach of the lever (that is, the distance between a handle bar and the lever at the rest position), this can be done independently of the deadband adjustment by pivoting the handle away from the caliper housing to disengage the snap fit between the ball head 90 and the ball socket 96 of the socket insert 94. Once disengaged, the female pushrod 86 maybe rotated about its axis to extend or retract the female pushrod relative to the male pushrod to adjust the reach as desired. While the current embodiment may allow adjustment in 180° increments, other configurations allowing smaller increments of variation or perhaps event infinite variation of the lever reach are within the possession of those skilled in the art and within the scope of the invention.

Figure 6:
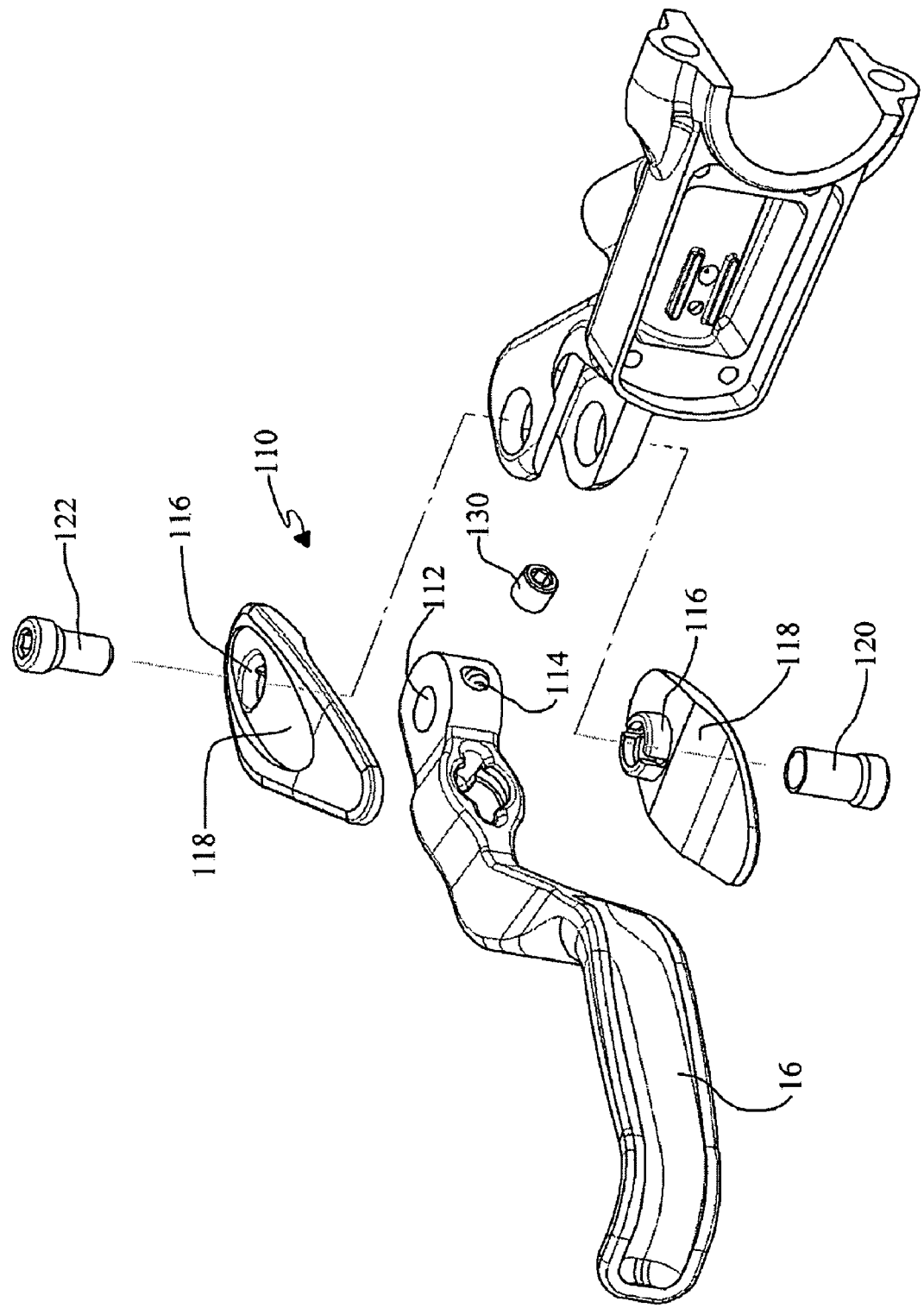
FIG. 6 is an exploded view of the lever handle attachment assembly of the master cylinder lever of FIG. 1.

FIG. 6 is an exploded view of the lever pivot assembly 110 of the first embodiment of the master cylinder lever of FIG. 1. The lever pivot assembly 110 consists of an axial bore 112 about which the lever handle 16 pivots. A threaded hole 114 perpendicularly intersects the bore 112. A slotted bushing 116 (preferably made of plastic) which is part of a bushing plate 118 extends into each end of the bore 112. A female bolt 120 is received through one slotted bushing while a male bolt 122 is received through the other slotted bushing so that they threadably engage within the bore 112. As perhaps best seen in FIG. 8, the slotted bushings 116 each have annular camming tapers 124 between smaller and larger diameter portions of the bushing. A head of the female bolt 120 similarly has a camming taper which mates with the camming taper 124 of the bushing. Likewise, the male bolt has a cammed surface which mates with a corresponding cammed surface of its corresponding bushing. Referring to FIG. 8, as should be apparent to one skilled in the art, as the male bolt is threaded into the female bolt in the assembled configuration, the cam relationship causes the bushings to expand radially as the bolts are drawn axially together. This causes any "slop" in the pivotal connection between the lever handle and the caliper housing to be taken up. A lock screw 130 is threadably received in the threaded hole 114 and, as illustrated in FIG. 8, can be threadably inserted in the hole to lock the male and female bolts in their select position. As the pivot wears the lock screw 130 can be backed off and the female and male bolts more tightly threadably engaged to pickup any slop.

Figure 9:
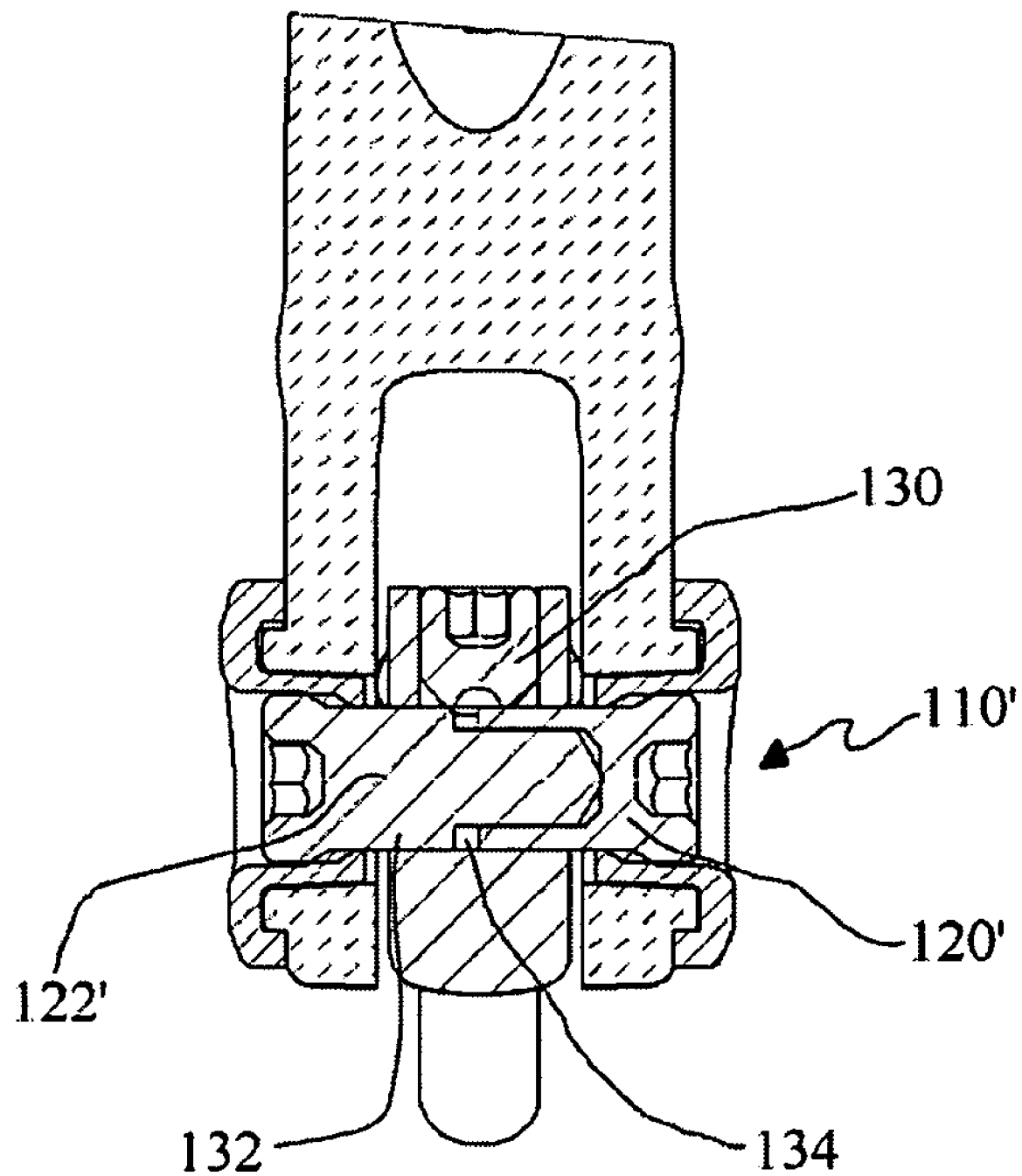
FIG. 9 is an alternate embodiment of the adjustable lever pivot assembly of FIG. 8.

FIG. 9 is an alternate embodiment of the adjustable lever pivot assembly 110'. This embodiment differs in that the male bolt has a portion having an outer diameter equivalent to the outer diameter of the female bolt illustrated at 132 and the female bolt does not extend as far axially as the embodiment illustrated in FIG. 8. A gap 134 is provided between this enlarged diameter 132 of the male bolt 122' and the female bolt 120'. In this embodiment, the lock screw 130 directly engages each of the male bolt 122 and the female bolt 120 which may provide more secure locking although it may not provide as much axial adjustment from either end of the lever.

Figure 10:
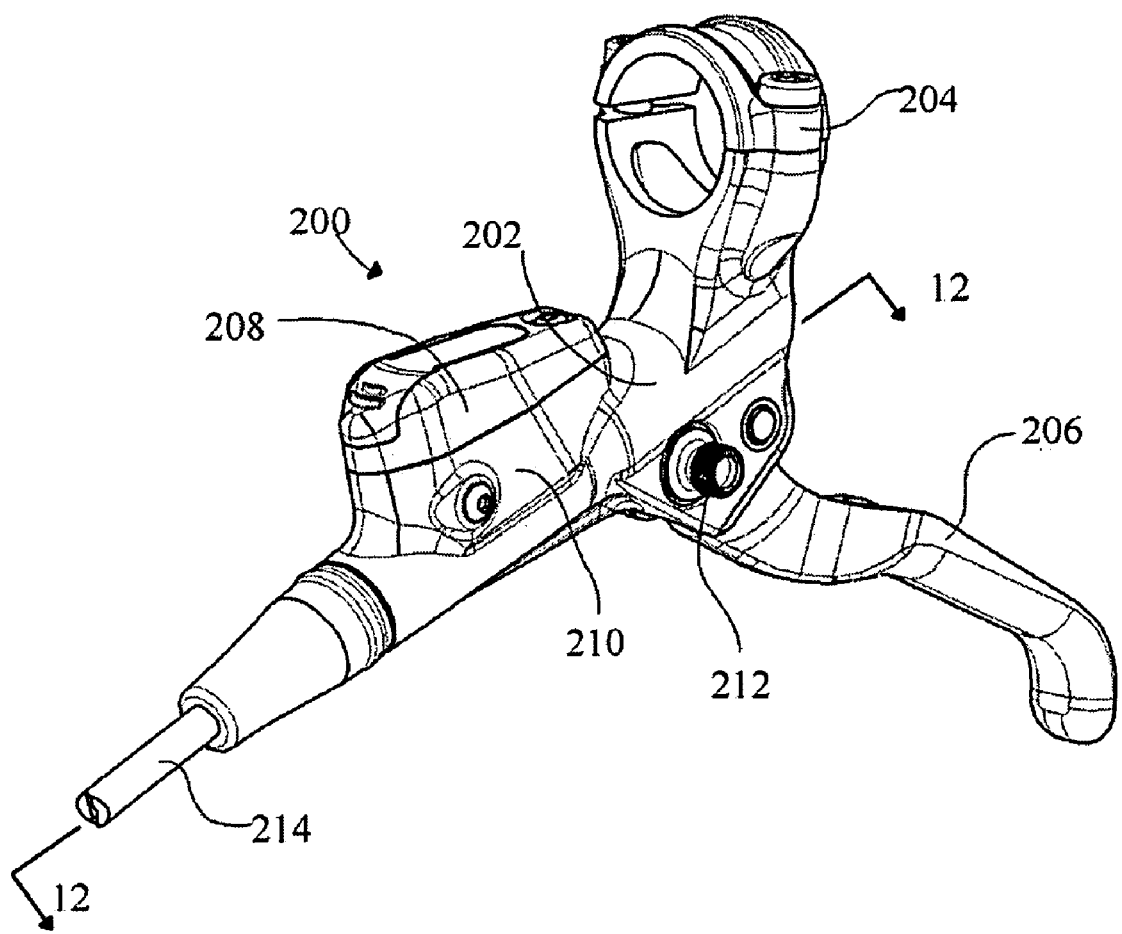
FIG. 10 is a perspective view of a second embodiment of a master cylinder lever for a hydraulic disc brake in accordance with the present invention.

FIG. 10 is a second embodiment of a master cylinder lever for a bicycle hydraulic disc brake 200 of the present invention. The second embodiment of the master cylinder lever assembly 200 consists of a cylinder housing 202 having a bar clamp 204 at one end and lever handle 206 pivotably attached to the housing at an opposite end. A reservoir housing 208 covers a hydraulic fluid reservoir 210 which will be discussed in greater detail below. Also visible in FIG. 10 is a worm knob 212 used to adjust the lever dead-band in a manner that will be discussed in greater detail below. The master cylinder housing 202 is hydraulically connected to a slave cylinder which operates a hydraulic caliper (not shown) by hydraulic line 214.

Figure 11:
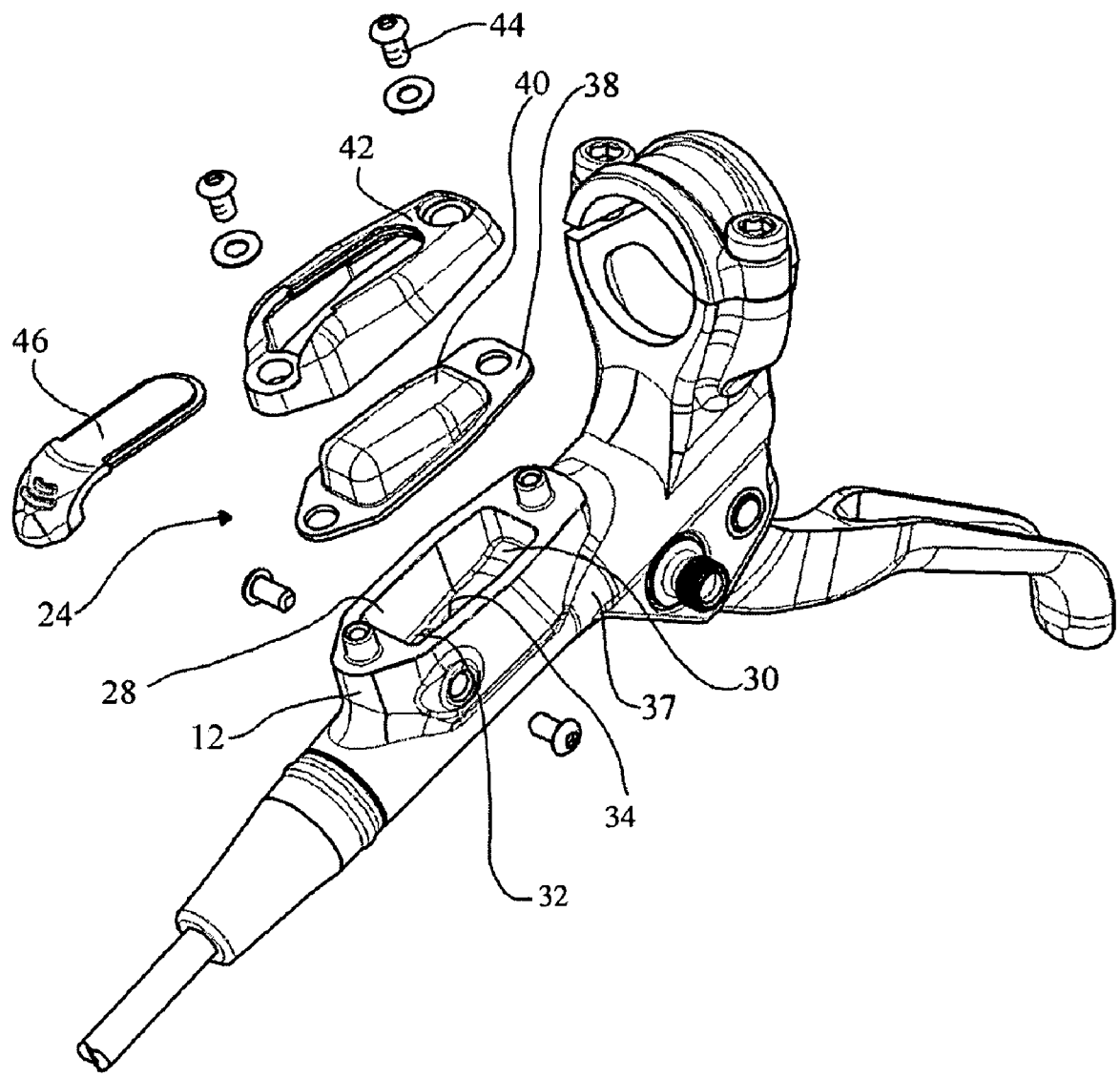
FIG. 11 is an exploded view of the backpack reservoir of the master cylinder lever of FIG. 10.

FIG. 11 is an exploded view of a "backpack" reservoir of the master cylinder lever of FIG. 10. The backpack reservoir of FIG. 11 is identical in its configuration to the backpack reservoir of FIG. 2 except it is oriented substantially horizontally within the lever housing whereas the backpack reservoir of the first embodiment of the master cylinder lever of FIG. 1 is oriented vertically. The same reference numbers are used to describe like elements and the detailed description of these elements is provided above with reference to FIG. 2.

Figure 12:
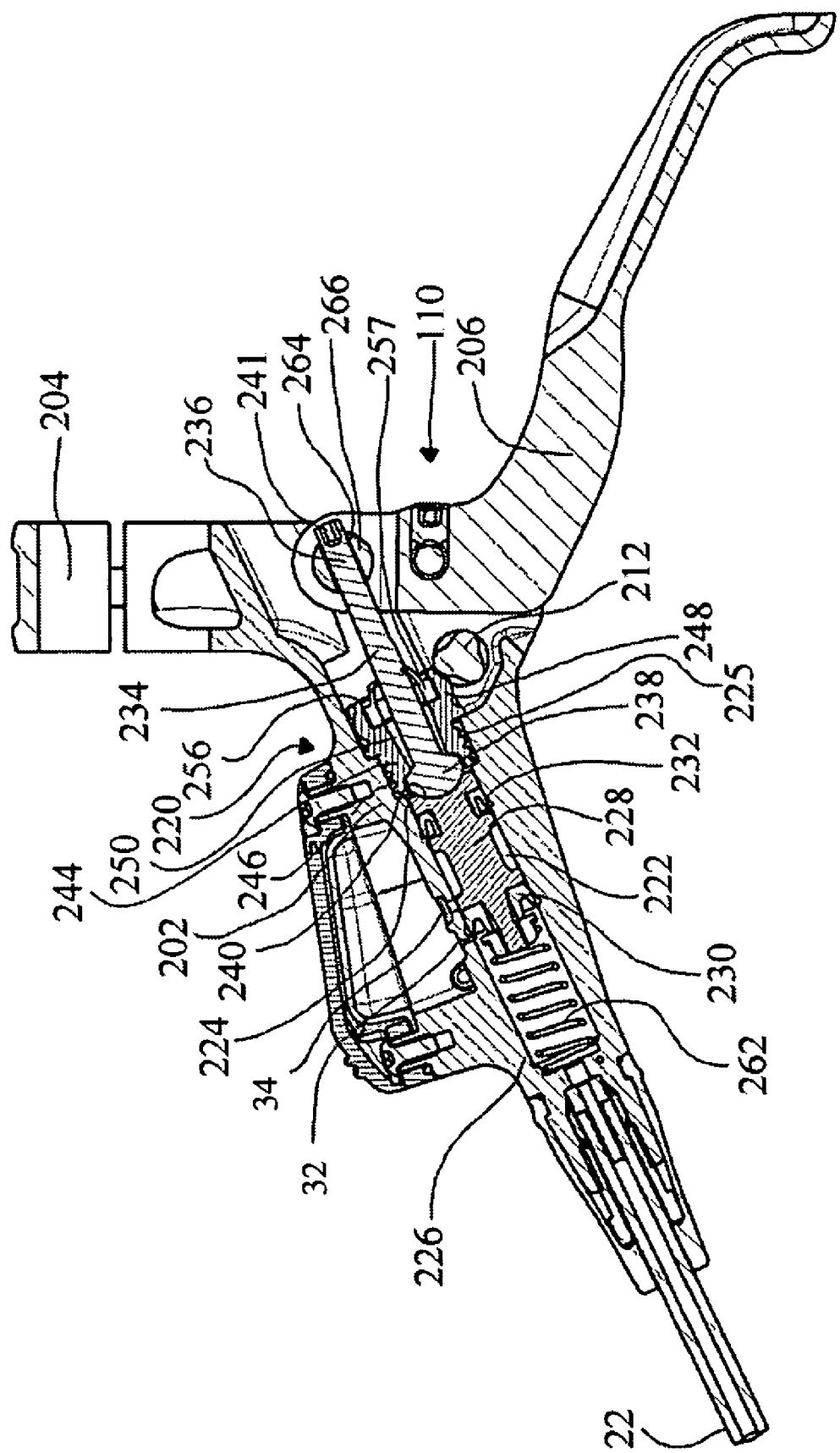
FIG. 12 is a cross-section of the master cylinder of FIG. 10 taken along line 12-12 of FIG. 10.
Figure 13:
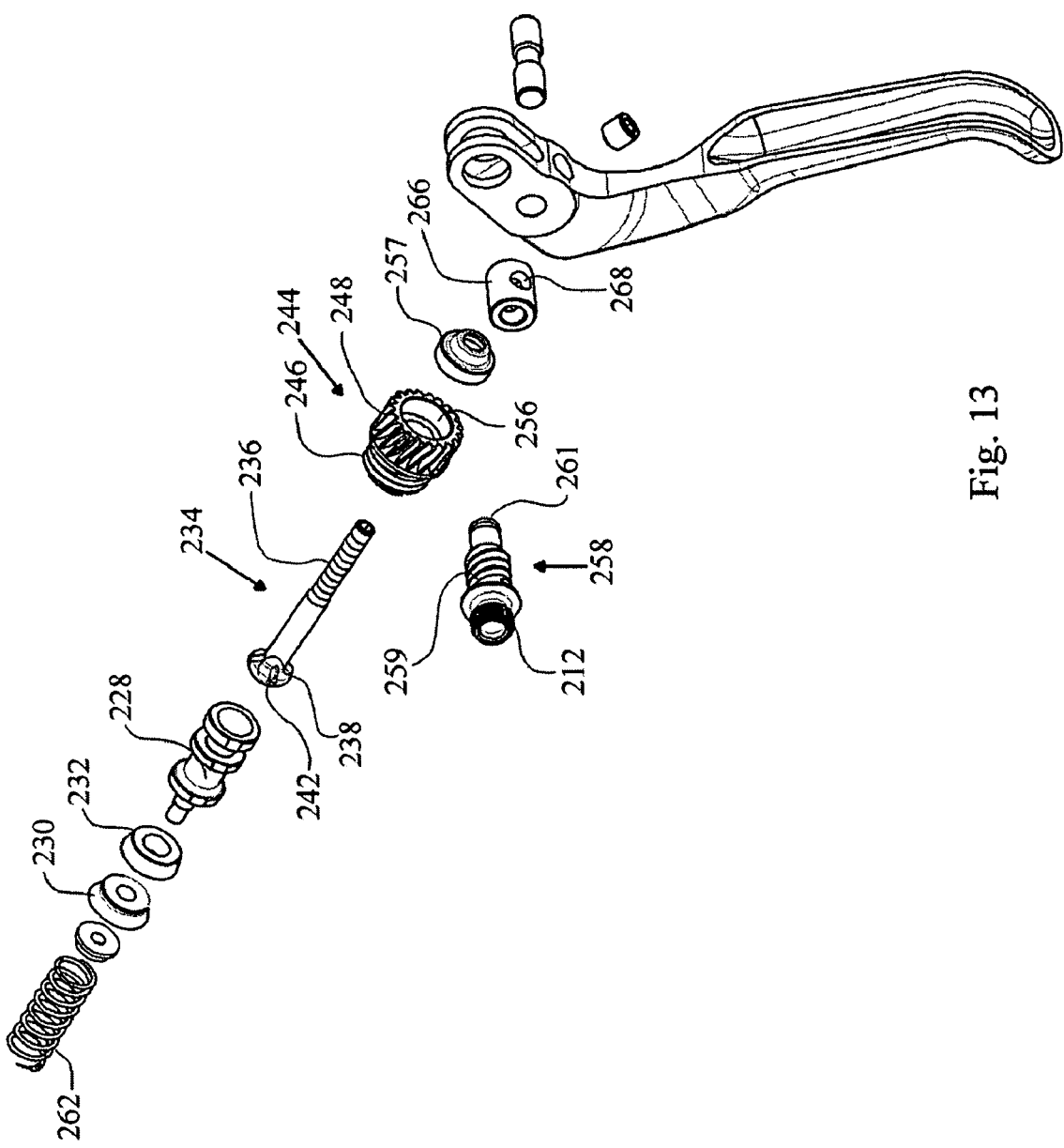
FIG. 13 is an exploded view of the piston train of the master cylinder lever of FIG. 10.

FIG. 12 is a cross-section the master cylinder lever assembly of FIG. 10 taken along line 12-12 of FIG. 10. FIG. 12 illustrates a piston train 220 received within a cylinder 222 defined within the hydraulic cylinder housing 202. The cylinder 222 has a first end 224 and a second end 226. A threaded countersink 225 in the housing 202 abuts the second end 226 of the cylinder 222, coaxial with a longitudinal axis of the cylinder. FIG. 13 illustrates the piston train 220 in an exploded view and the same reference numbers will be used to identify like elements in FIGS. 12 and 13.

Figure 14:
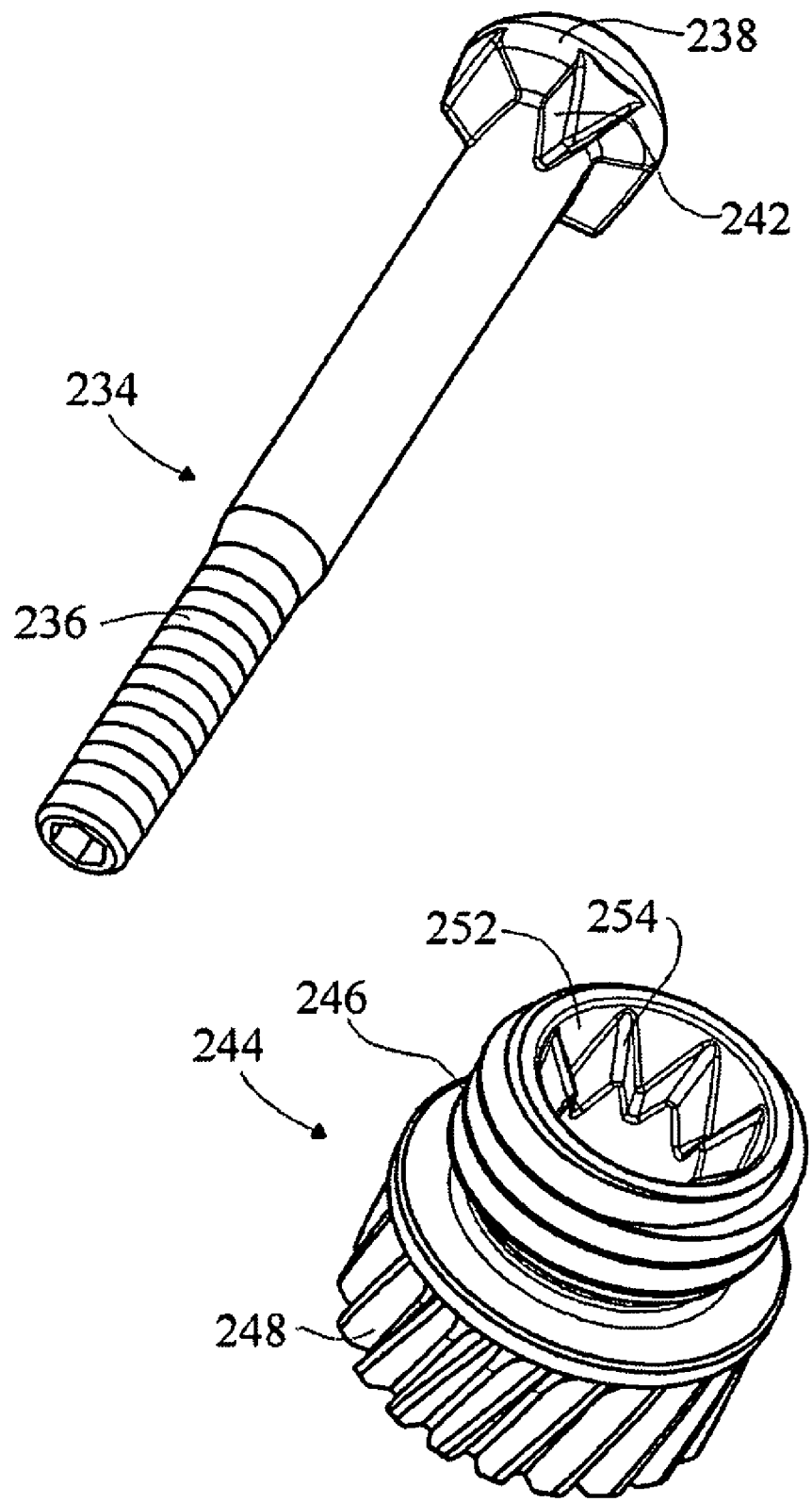
FIG. 14 is a perspective view of the push rod and threaded insert of the master cylinder lever of FIG. 10.

The piston train 220 consists of a piston 228 within the cylinder 222. The piston 228 has a first annular cup or umbrella seal 230 near a leading end and a second annular cup or umbrella seal 232 near a trailing end. A push rod 234 has a threaded portion 236 at a first end and a head 238 at a leading second end. A leading portion of the head 238 defines a ball surface which is received in a corresponding cup surface 240 in a trailing end of the piston 220. The threaded portion 236 of the push rod 234 is threadably engaged with the lever handle 206 in a manner that will be discussed in greater detail below. A hex orifice 241 is defined in the second end of the push rod and sized to fit an appropriate Allen wrench. A plurality of radial ribs 242 extend axially from a rear surface of the head 238 opposite the ball surface (see FIG. 14). An externally threaded insert 244 has an externally threaded leading axial portion 246 and a trailing axial portion 248 having radially inclined gear teeth which are best viewed in FIGS. 13 and 14. The threaded insert 244 further has an axial bore 250 having conical side walls. The bore 250 opens at the first end to an annular pocket 252 having axially extending teeth 254 configured to mate with the radial ribs 242 which extend axially from the rear surface of the head 238 (See FIG. 14). Externally threaded insert 424 further includes a rearward facing pocket 256 receiving an elastomeric annular wipe seal 257 having a nipple which forms a seal with the push rod 234.

A worm 258 is received in the housing along an axis transverse an axis of the cylinder. The worm 258 has a threaded shaft 259 and a worm knob 212. The threads 259 of the threaded shaft threadably engage the radially inclined teeth 248 of the externally threaded insert 244. A C-clamp (not shown) or the like secures the worm 258 within the transverse bore in the housing by engaging an annular groove 261 in the distal end of the threaded shaft 259.

A coil spring 262 resides between a second end 226 of the cylinder and a leading end of the piston 228 to bias the piston toward the first end 224. The coil spring also compresses the radial ribs 242 of the push rod head 238 into mated engagement with the axially extending teeth 254 of the threaded insert 244 so the push rod 234 rotates axially as the threaded insert is rotated.

The lever handle 206 may be pivotably attached to the housing by lever pivot assembly described above with reference to FIGS. 6 and 8. Alternatively, a conventional pivot coupling may be used. Spaced from the lever pivot assembly 110, is a bore 264 in the lever along an axis parallel to the axis of the lever pivot assembly and transverse the axis of the cylinder 222. A cross dowel 266 is received in the bore 264. The cross dowel 266 includes a threaded bore 268 transverse the dowel axis. Referring to FIG. 12, this threaded bore 268 threadably receives the threaded portion 236 at the first end of the push rod 234.

The basic operation of the master cylinder lever 200 of FIG. 12 is similar to that of the first embodiment of the master cylinder lever 10 discussed above with reference to FIG. 3. The lever handle 206 is shown at a rest position in FIG. 12. As the lever is pivoted upward toward the bar clamp 204 and toward a fully actuated position, the push rod 234 is driven forward which in turn causes the piston 228 to move toward the second end 226 of the cylinder 222. As the piston 228 moves toward the second end 226 of the cylinder 222 the leading cup or umbrella seal 230 covers the timing port 32 which prevents flow of fluid from the cylinder into the reservoir and causes build up of pressure in the second end of the hydraulic fluid cylinder which in turn pressurizes fluid within the hydraulic fluid line 22 and which in turn actuates a slave cylinder within a hydraulically coupled brake caliper (not shown). When the lever handle 16 is released, the compressing spring 262 biases the piston 228 toward the first end 224 of the cylinder to reassume the position shown in FIG. 12. Pivoting of the push rod 234 about the head 238 by pivoting of the lever handle 206 is accommodated by the conical side walls of the axial base 250.

The distance between the cup seal 230 and the timing port 32 is referred to as the dead-band. As described above with reference to FIG. 3, during the part of lever actuation where the cup seal is between the timing port 32 and the first end of the cylinder, fluid in the reservoir between the seal and the timing port returns to the reservoir 30. During this part of lever actuation, the second end of the cylinder cannot be pressurized. To adjust the length of dead-band, the piston can be advanced in the cylinder by rotating the knob 212 in a first direction which in turn causes rotation of the threaded insert to threadably advance the threaded insert within the threaded countersink 225 along the cylinder axis, thereby advancing the piston toward the second end of the cylinder. Turning of the knob 212 in a second direction reverses the direction of the threaded insert to increase the dead-band. The ball and socket connection between the cup 240 at the trailing end of the piston and the ball at the leading end of the head 238 of the push rod 234 prevents the piston from rotating relative to the threaded insert which helps maintain the integrity of the seals.

The second embodiment of the hydraulic cylinder lever of FIG. 12 also includes a structure for compensating for movement of the push rod during dead-band adjustment to maintain the lever 206 in a select rest position. The threads between the threaded portion 236 of the push rod and the threaded bore 268 of the cross dowel 266 are configured to counteract pivoting of the handle that would otherwise occur about the lever pivot assembly 110 when the push rod 234 is moved by movement of the threaded insert 244. In other words, as the threaded insert 244 is advanced toward the second end of the cylinder, which necessarily causes the advancement of the push rod 234 toward the second end of the cylinder and which would normally cause the lever handle 206 to pivot upward, the threaded engagement between the second end of the push rod and the cross dowel tends to move the lever handle 206 downward in an amount that corresponds to what would be the upward movement so as to maintain the lever handle 206 at a select start position.

In the event a user wishes to adjust the reach of the lever, this can be done independently of the dead-band adjustment. Insertion of an Allen wrench into the hex orifice 241 allows for axial rotation of the push rod 234. However, the worm connection between the threaded insert 244 and the worm 258 prevents rotation of the threaded insert 244 by the push rod 234. Because the threaded insert 244 is relatively fixed against rotation, turning of the push rod 234 causes disengagement between the radially extending ribs 242 of the head 238 and the complimentary axially extending teeth 254 in the externally threaded insert against the bias of the spring 262 and allows for pivotal movement of the lever handle 206 up or down in accordance with user preferences to provide a select reach. The teeth 254 and ribs 242 preferably have inclined, mating surfaces which define ramps facilitating this disengagement against the force of the bias of the spring 262. Disengagement can be aided by pushing axially on the Allen wrench against the spring bias as the push rod 234 is rotated.

In a highly preferred embodiment, the axis of the threaded bore in the cross dowel is provided to not intersect with the cross dowel axis. This has the effect of locking the push rod in place relative to the cross dowel when a load is placed on the lever handle 206 so as to prevent relative rotation between the push rod 234 and the cross dowel 236. This feature thereby prevents inadvertent variation of the lever reach during lever actuation. An off-set of between 0.01-0.04 inches between the axes has been found to be sufficient.

Figure 15:
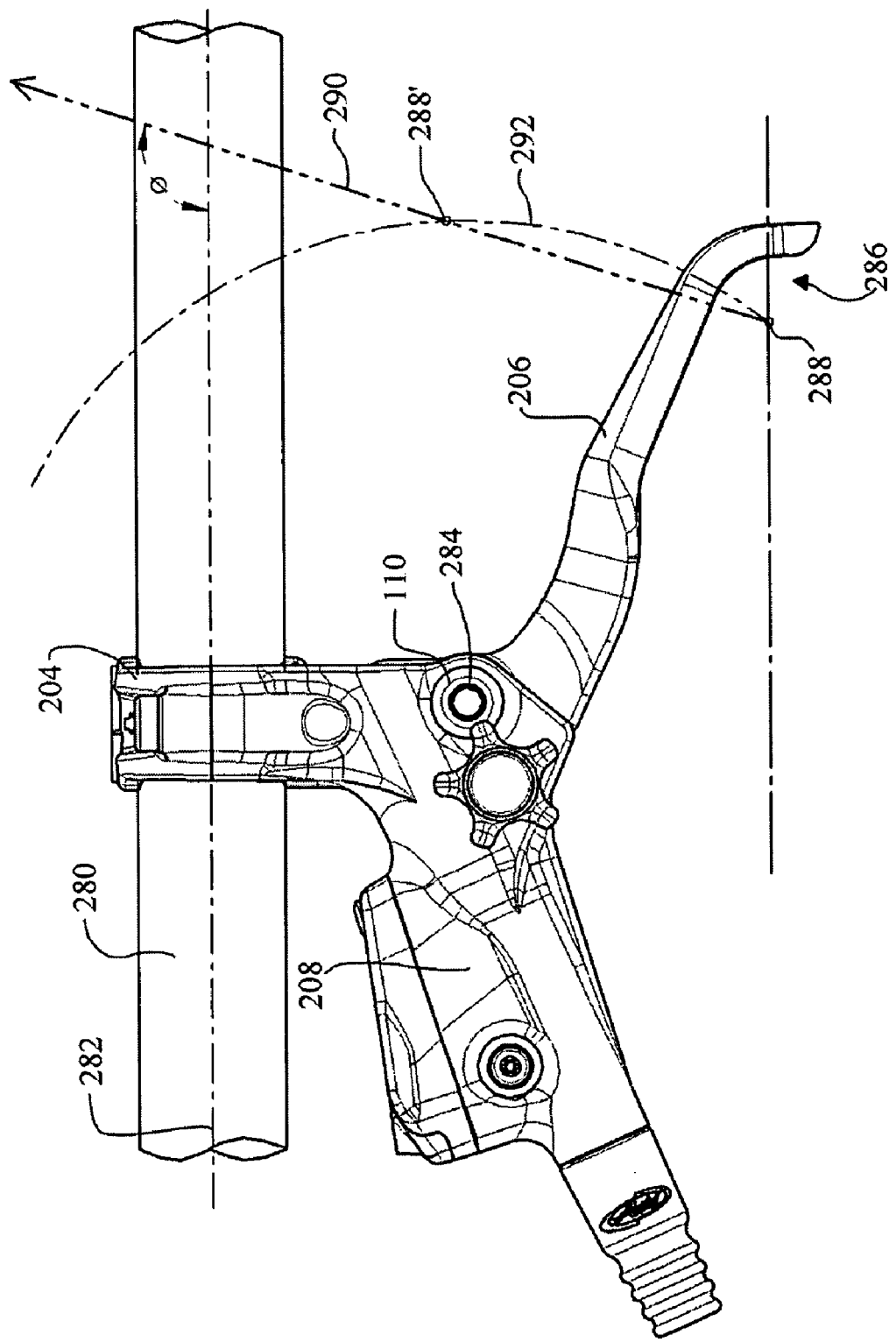
FIG. 15 is a side elevation view of the master cylinder lever of FIG. 10.

FIG. 15 is a side elevation view of a master cylinder lever of FIG. 10. This figure is used to illustrate an embodiment of a lever geometry which has been found to provide significant advantages in lever operation. The bar clamp 204 is designed to receive a handle bar 280 along a clamp axis 282. The lever handle 206 is pivotably connected by lever pivot assembly 110 about a pivot axis 284. In a highly preferred embodiment, the pivot axis is 39 mm from the clamp axis. The lever handle 206 defines a finger receptacle 286 configured to receive at least one finger of a user. In the embodiment illustrated in FIG. 15, the finger receptacle 286 is configured to receive two fingers of a user and effective finger force point 288 is defined by approximately the center of a typical user's two fingers. For the purpose of this application and the charts and calculations herein, the location of the finger force point is deemed to be 30.0 mm from the end of the lever when based on an estimate of an average user's finger size. A select finger actuation path is defined by arrow 290, and extends from the effective finger force point 288 at an "engagement point" of the lever. As used herein, the "engagement point" means a point along the arc of lever actuation where the pads of a caliper operatively associated with the master cylinder lever begin compressing a disc therebetween. In other words, a point where the lever handle drives the piston train against operative fluid resistance. The select ideal finger actuation path 290 is a design criteria intended to estimate a typical finger path of a user of the brake in typical operating conditions. Based upon observations of users, the select ideal finger actuation path is at an angle $\theta$ 90° or greater. In FIG. 15 the angle $\theta$ is 96°, a best estimate of a typical average finger path. Actual finger paths may range from 90°-108°, or even greater than 108°. An arc 292 is defined by movement of the effective force point 288 as a lever is actuated between the engagement point position shown in FIG. 15 and a fully actuated position with the effective force point 288 at point 288' in FIG. 15.

In one embodiment of the invention illustrated in FIG. 15, the pivot axis 284 is preferably spaced from the clamp axis 282 a distance such that a chord between the points 288 and 288' of the arc 292 substantially corresponds to the select ideal finger actuation path 290. In this manner, a user experiences a mechanical advantage resulting from handle actuation that does not substantially decrease as the handle is pivoted between the at rest position and the fully actuated position. The angle of the chord between the point 288 and 288' could actually be slightly less than the angle θ, but should be no less than 6° less than the angle θ so as to prevent an unacceptable loss of mechanical advantage.

The desired chord defined by the arc between the rest position and the fully actuated position of the effective finger force point is able to meet the criteria of substantially corresponding to an ideal finger actuation path in the range of greater than 96° if the pivot axis 284 can be brought close enough to the clamp axis 282. In the embodiment illustrated in FIG. 15, this geometry is facilitated by locating the reservoir 208 and the cylinder 222 of the master cylinder lever housing generally parallel to the clamp axis 282, and the pivot 39 mm from the clamp axis. Where the master cylinder is aligned vertically as with the first embodiment illustrated in FIGS. 1-5, it would be very difficult to meet these design criteria because the cylinder and reservoir reside between the pivot axis 284 and the clamp axis 282. This is illustrated in FIG. 7. Here, the arc 292' defined by pivotal movement of the effective finger force point 288 from the engagement point to the fully actuated position 288' defines a chord 294' that forms an angle less than 90° from the clamp axis 282. However, the angle θ of the select ideal finger actuation path is greater than 90°, again preferably greater than 96°. As a result, a user would sustain a significant loss of mechanical advantage when trying to actuate the lever handle 206 along the select ideal finger actuation path 290'.

Figure 16:
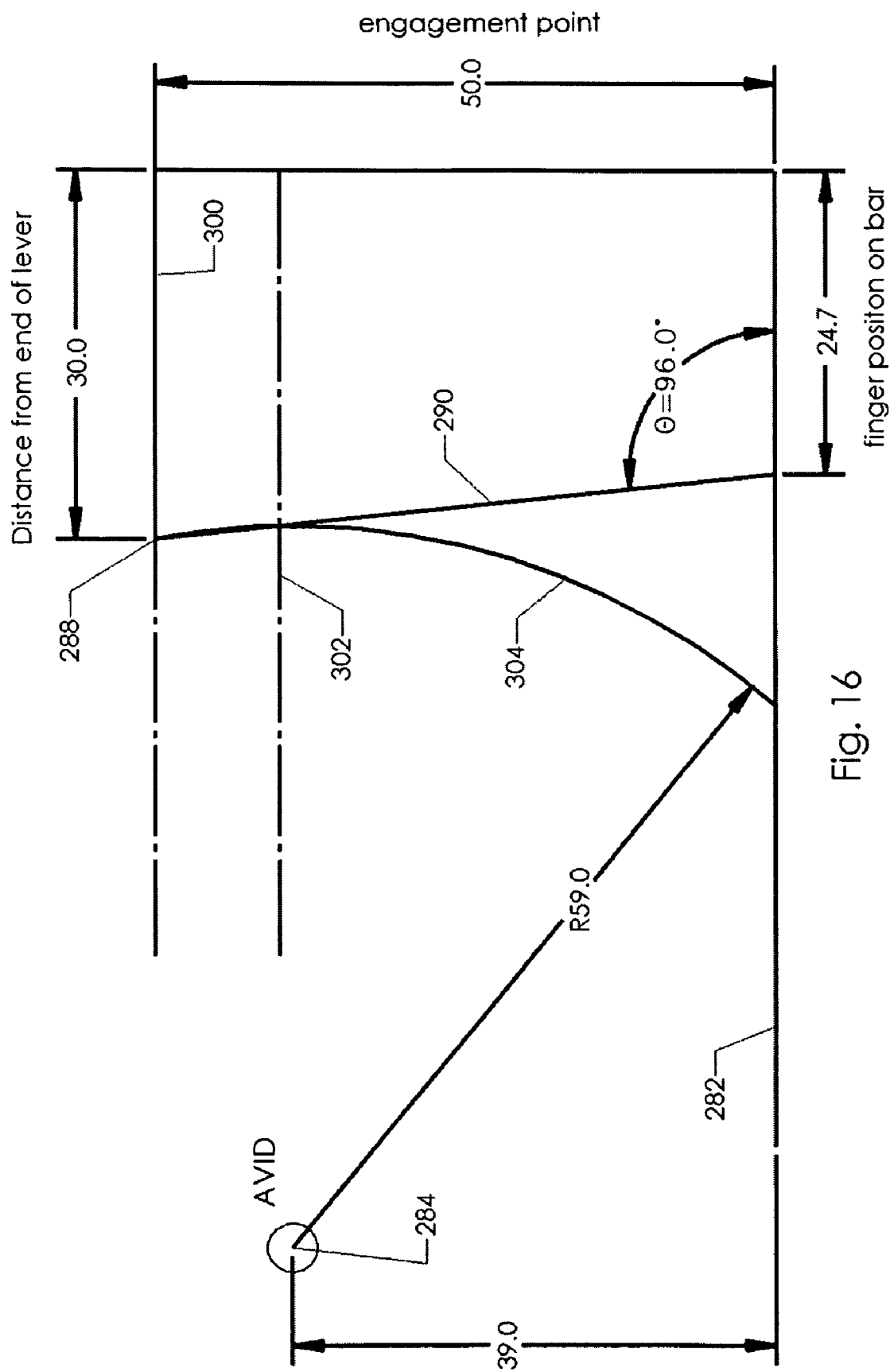
FIG. 16 is a schematic representation of the geometry of the lever of the present invention.
Figure 17A:
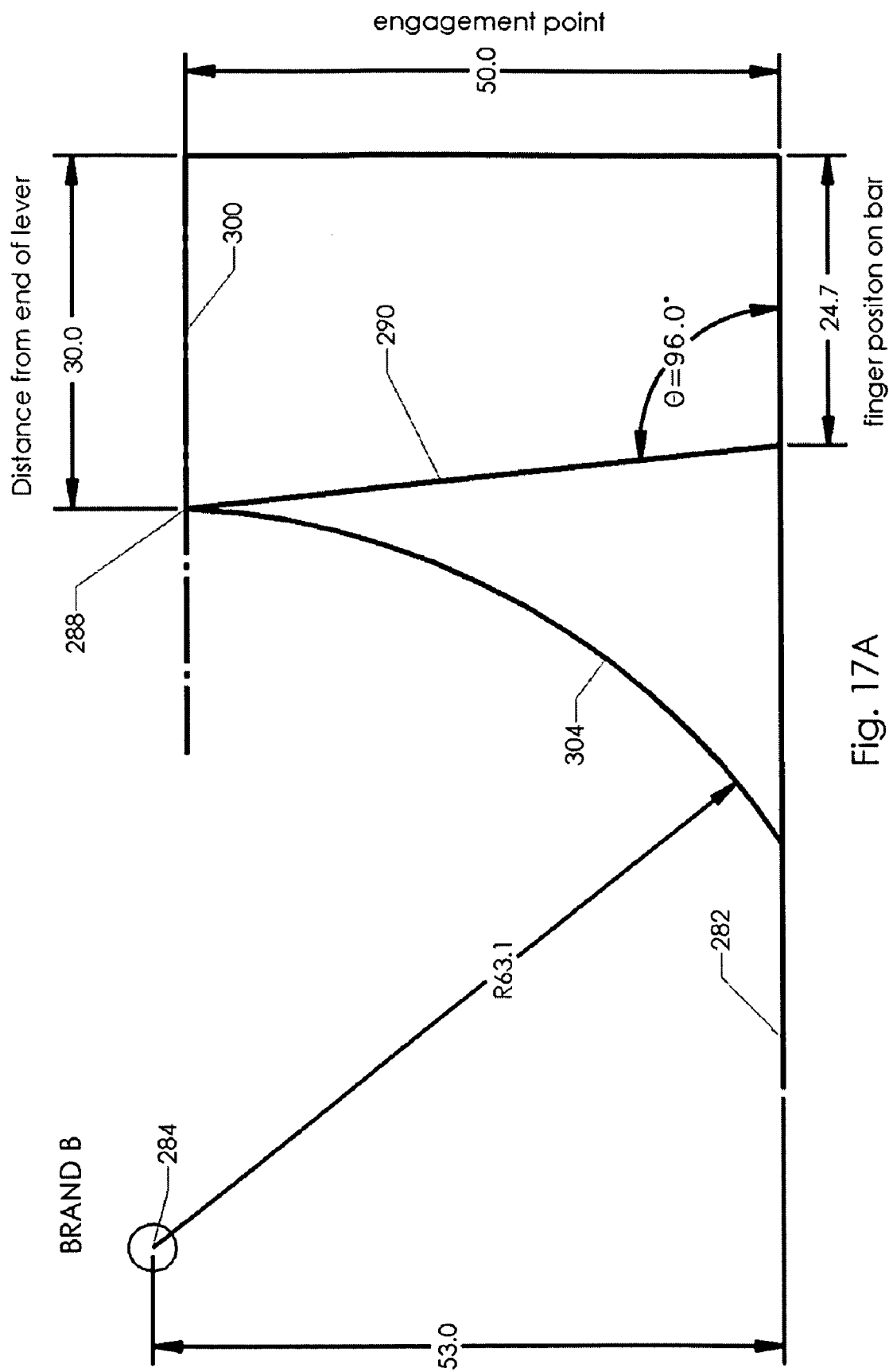
FIG. 17A is a schematic representation of the geometry of a Brand B lever.
Figure 17B:
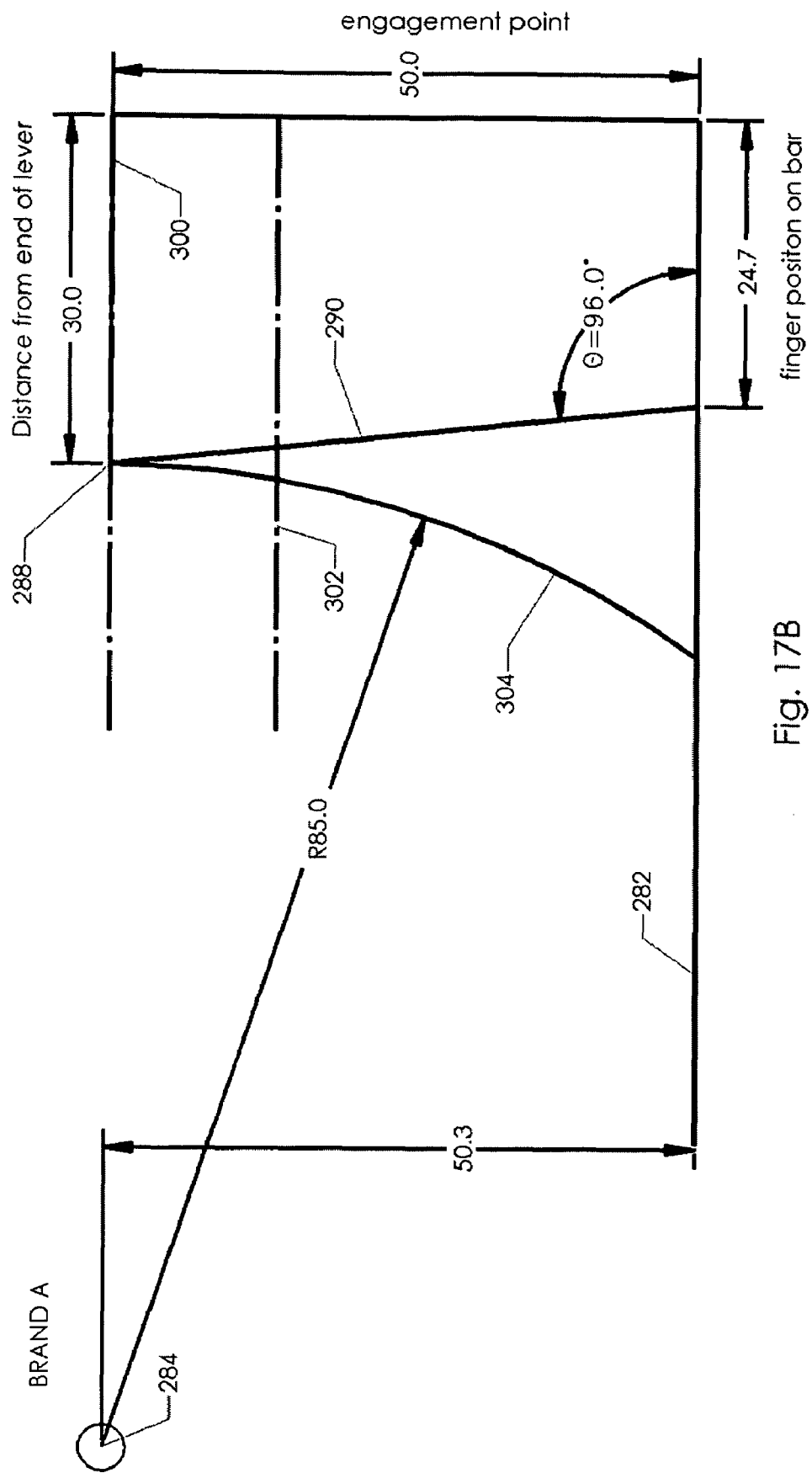
FIG. 17B is a schematic representation of the geometry of a Brand A lever.
Figure 18:
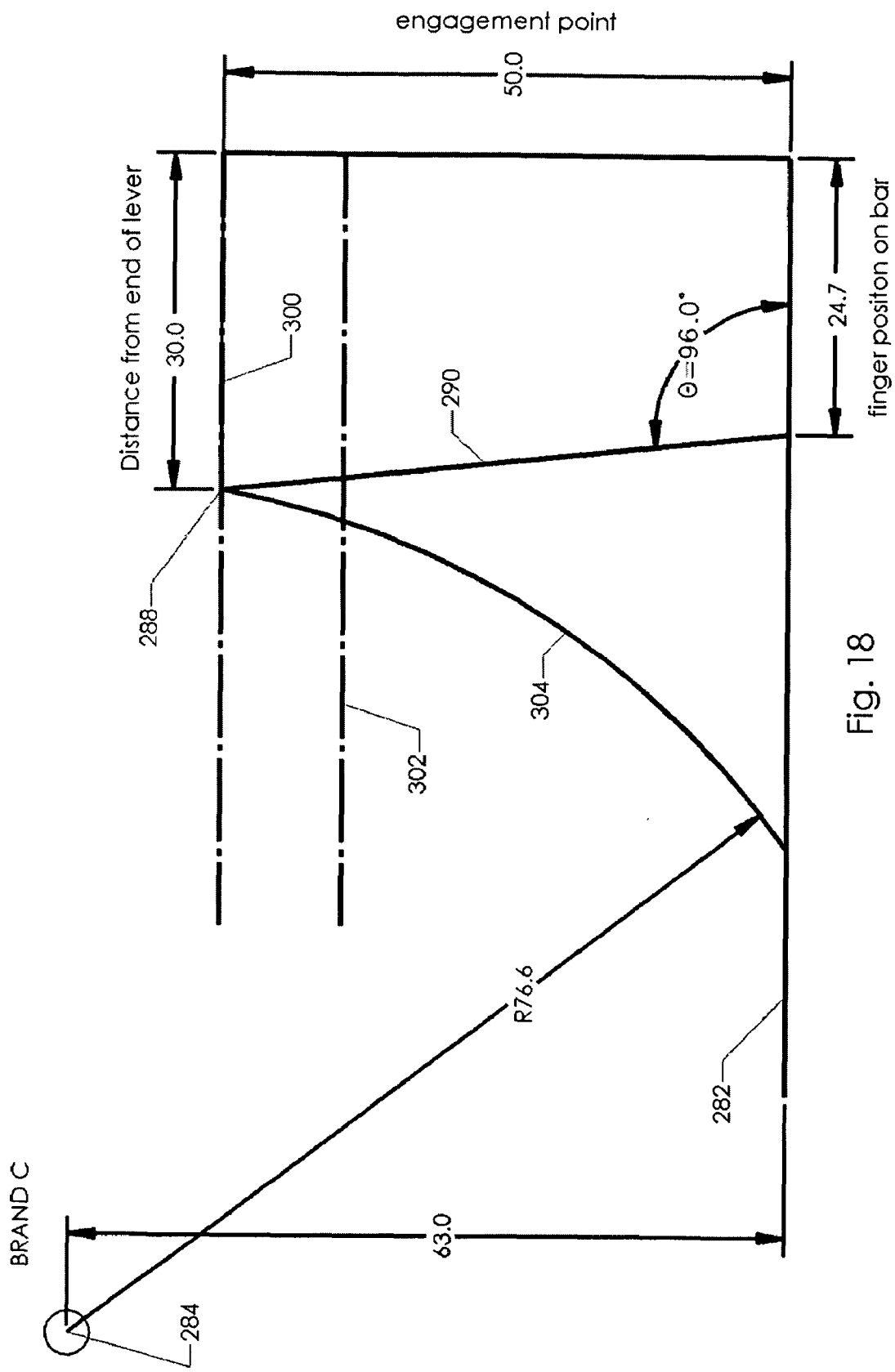
FIG. 18 is a schematic representation of the geometry of a Brand C lever.
Figure 19:
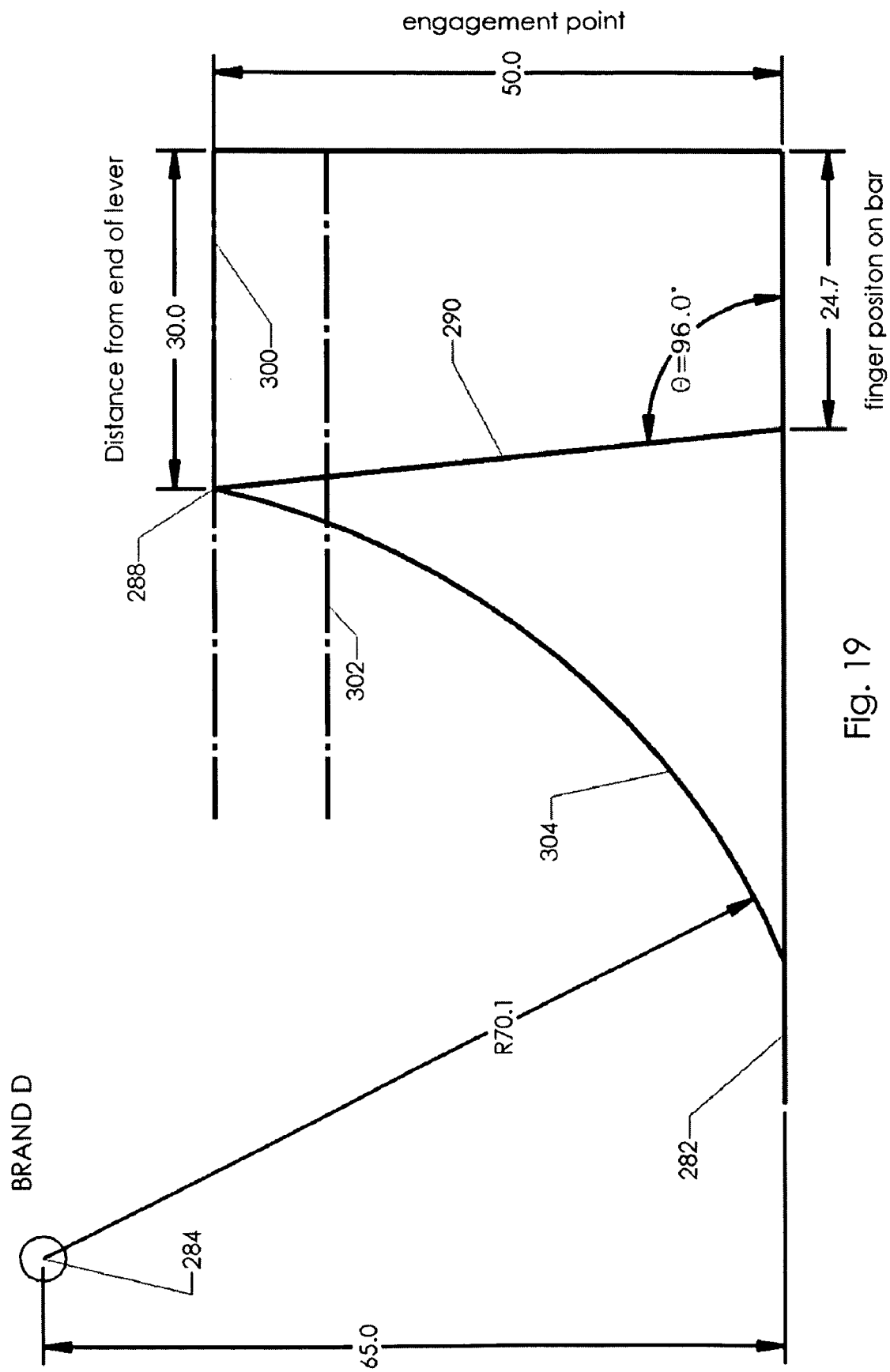
FIG. 19 is a schematic representation of the geometry of a Brand D lever.

FIGS. 16-19 illustrate the geometry of a highly preferred embodiment of the present invention as compared to representative hydraulic master cylinder levers on the market in 2002. FIG. 17A is a Brand B lever geometry. FIG. 17B is a Brand A lever geometry. FIG. 18 is a Brand C lever geometry. FIG. 19 is a lever geometry of a Brand D hydraulic brake lever.

Beginning with FIG. 16, in a highly preferred embodiment of the present invention, the pivot axis 284 is 39 mm from the clamp axis 282. For the purpose of this analysis, it is assumed that the engagement point is 50 mm from the clamp axis 282, and is illustrated by the line 300. The application of braking force from the engagement point to the conclusion of the lever movement is assumed to be 10 mm and is represented by the full actuation line 302. Finally, for the purpose of this analysis, the assumed ideal finger actuation pad 290 is an angle θ 96° from the clamp axis. The effective finger force point 288 is 30 mm from the bar end. The arc 304 represents the effective finger force point travel as the lever is actuated. A chord drawn between the engagement line where the effective finger force point is located at the beginning of brake actuation and the point that the full actuation line 302 intersects the arc 304 is at 96°, equal to the ideal finger path angle θ. This provides for a minimal loss of mechanical advantage as the lever is actuated.

In FIG. 17A the Brand B lever has a pivot axis 284 53 mm from the clamp axis 282. Again, assuming an engagement point 300 beginning 50 mm from the clamp axis and a full actuation line 302, 10 mm from the engagement point, it can be observed that the arc 304 of travel of the effective finger force point 208 deviates inwardly from the ideal finger path 290. The same is true in FIG. 17B, where the Brand A lever pivot axis is 50 mm from the clamp axis 282. As will be illustrated in the figures discussed below, this results in an increasing loss of mechanical advantage over the lever stroke.

FIGS. 18 and 19 represent the geometry of the Brand C and Brand D hydraulic brake levers respectively. Like numbers are used to identify like elements of these figures. Brand C, with the pivot axis located 63 mm from the clamp axis has a more pronounced deviation of the arc 304 from the ideal finger path 209 and thus, as will be illustrated below, has even a greater loss of mechanical advantage than the Brand B lever. Finally, the Brand D levers, with a pivot point 65 mm from the clamp axis, produces an even greater loss of mechanical advantage.

Figure 20:
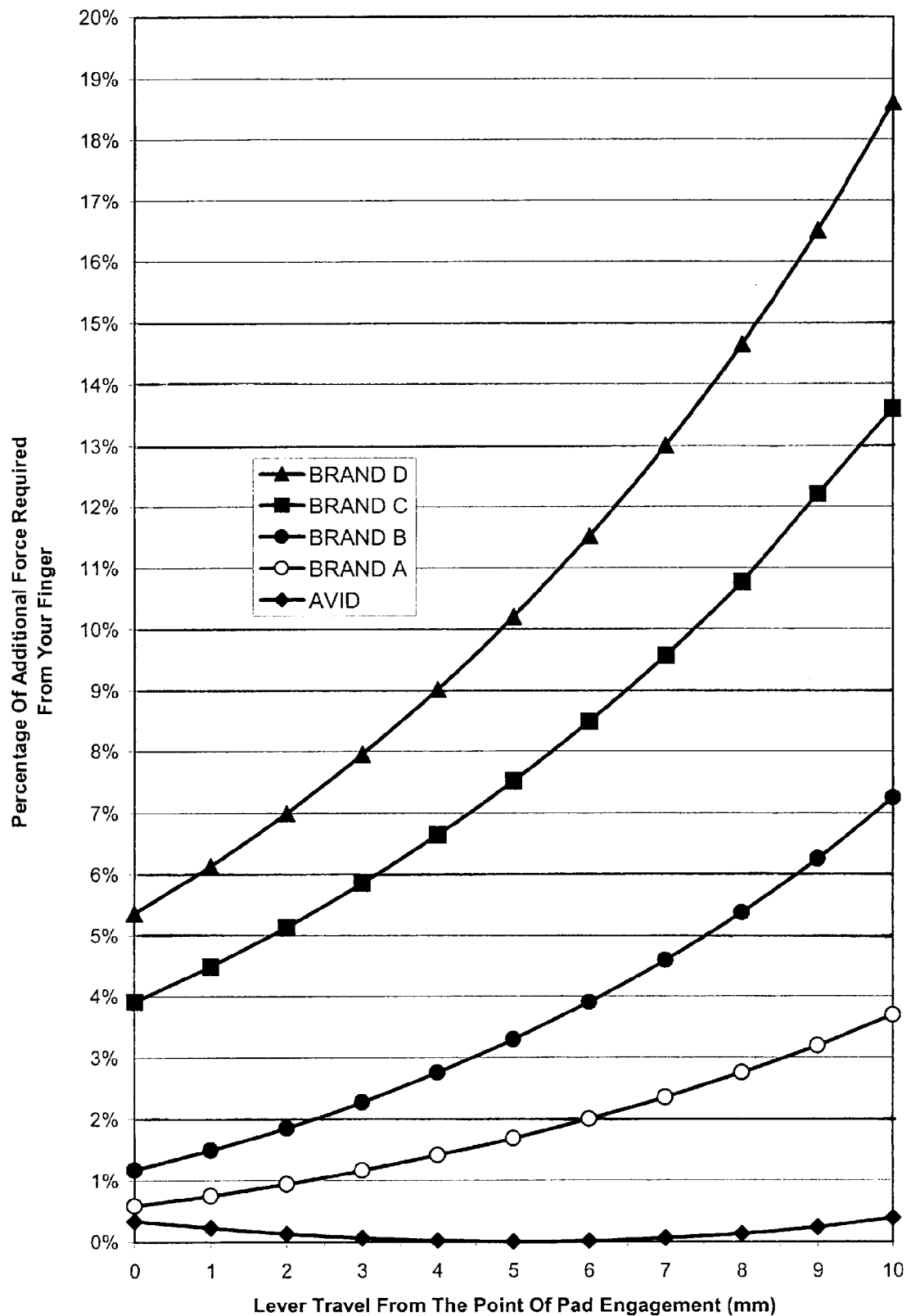
FIG. 20 is a graph of additional force required from a user's finger (%) versus lever travel from an engagement point for several brands of hydraulic levers as compared to the lever of the present invention.
Figure 21:
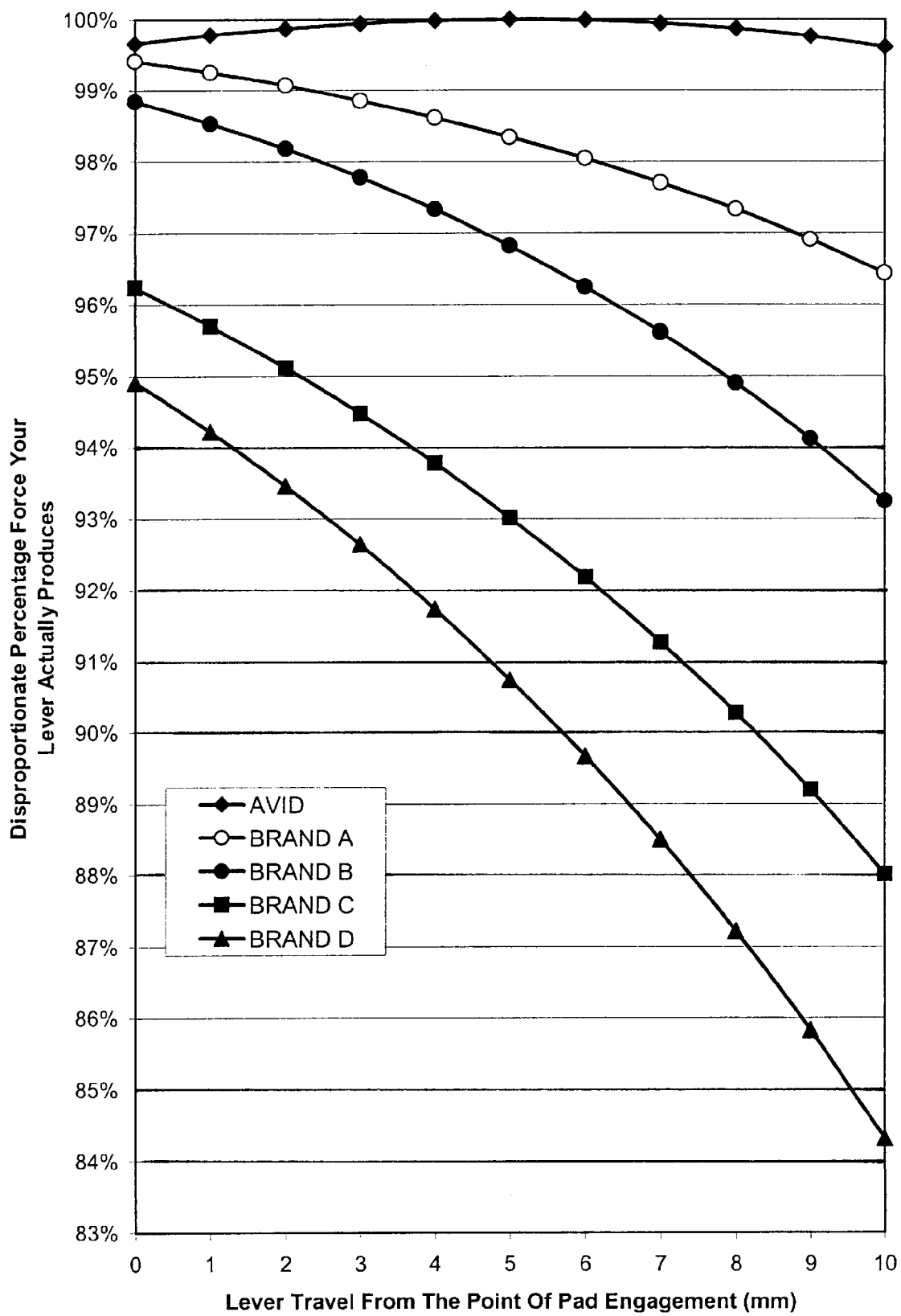
FIG. 21 is a graph of a percentage of power to a lever versus lever travel for the lever of the present invention versus several known levers.

FIGS. 20 and 21 illustrate the respective mechanical advantage of the lever geometry of the present invention, designated as Avid, and the Brands A-D illustrated schematically above. Referring first to FIG. 20, the geometry of Brands A-D levers each will result in applying an additional amount of force to the lever along the ideal finger path over the course of the lever actuation. With respect to the Avid lever of the present invention, it can be seen that the geometry actually produces an increasing mechanical advantage over the first 5 mm of lever travel and then a slight decrease of mechanical advantage (less than 1%) over the final 5 mm of lever travel. Over the full range of lever travel, a net loss of mechanical advantage is zero.

FIG. 21 is essentially the inverse of FIG. 20. It illustrates that the geometries of the Brand A-D levers result in a loss of power over the actuation stroke. Again, the Avid lever of the present invention actually provides improved power through the first 5 mm with slightly decreasing power over the final 5 mm of travel and no change in the net amount of power applied to the lever between the engagement point and full actuation of the lever.

Figure 22:
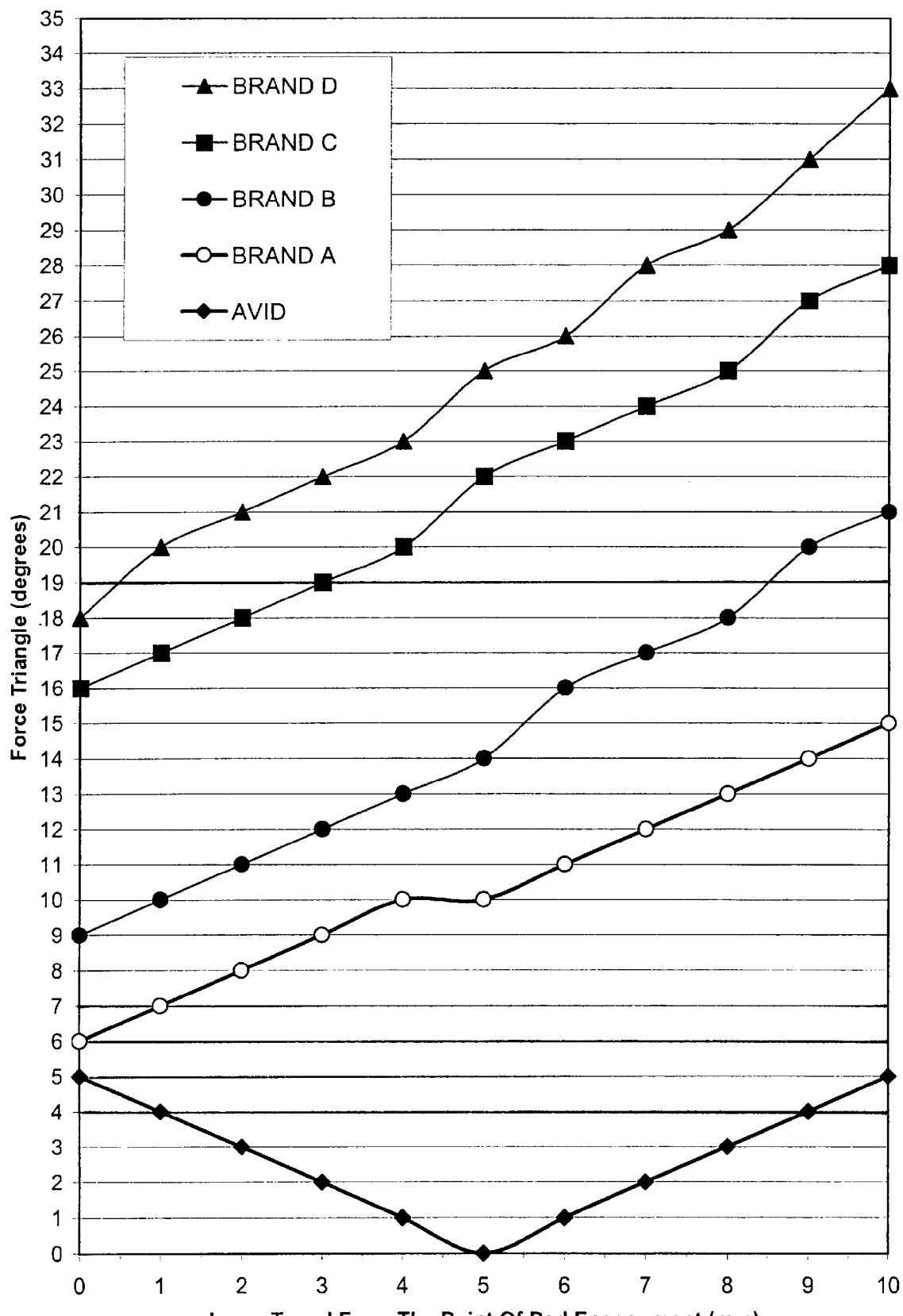
FIG. 22 is a plot of lever travel versus degrees deviation from perpendicular of finger force.

FIG. 22 illustrates where the loss of power comes from by comparing how far from perpendicular to the clamp axis the finger force is over the lever actuation stroke. For the geometry of the present invention (the Avid lever), the force begins 5 mm off, goes to perpendicular at about the center of the stroke and then returns to 5 mm off at the conclusion of the stroke. For Brands A-D, a significant deviation from perpendicular is present at the beginning of the stoke and increases from there.

As is apparent, the Avid lever geometry provides an increasing range of mechanical advantage over at least a portion of the lever actuation. In its broadest sense, the present invention can be characterized as the selection of a lever geometry having a pivot axis of 50 mm or less that is always equal to or closer to the clamp axis than the engagement point. This geometry produces a lever having an increasing mechanical advantage over at least a portion of the actuation stroke but does not encompass the geometry of the Brand A lever which is believed to be the lever having the pivot axis the closest to the clamp axis known in the art.

Figure 23:
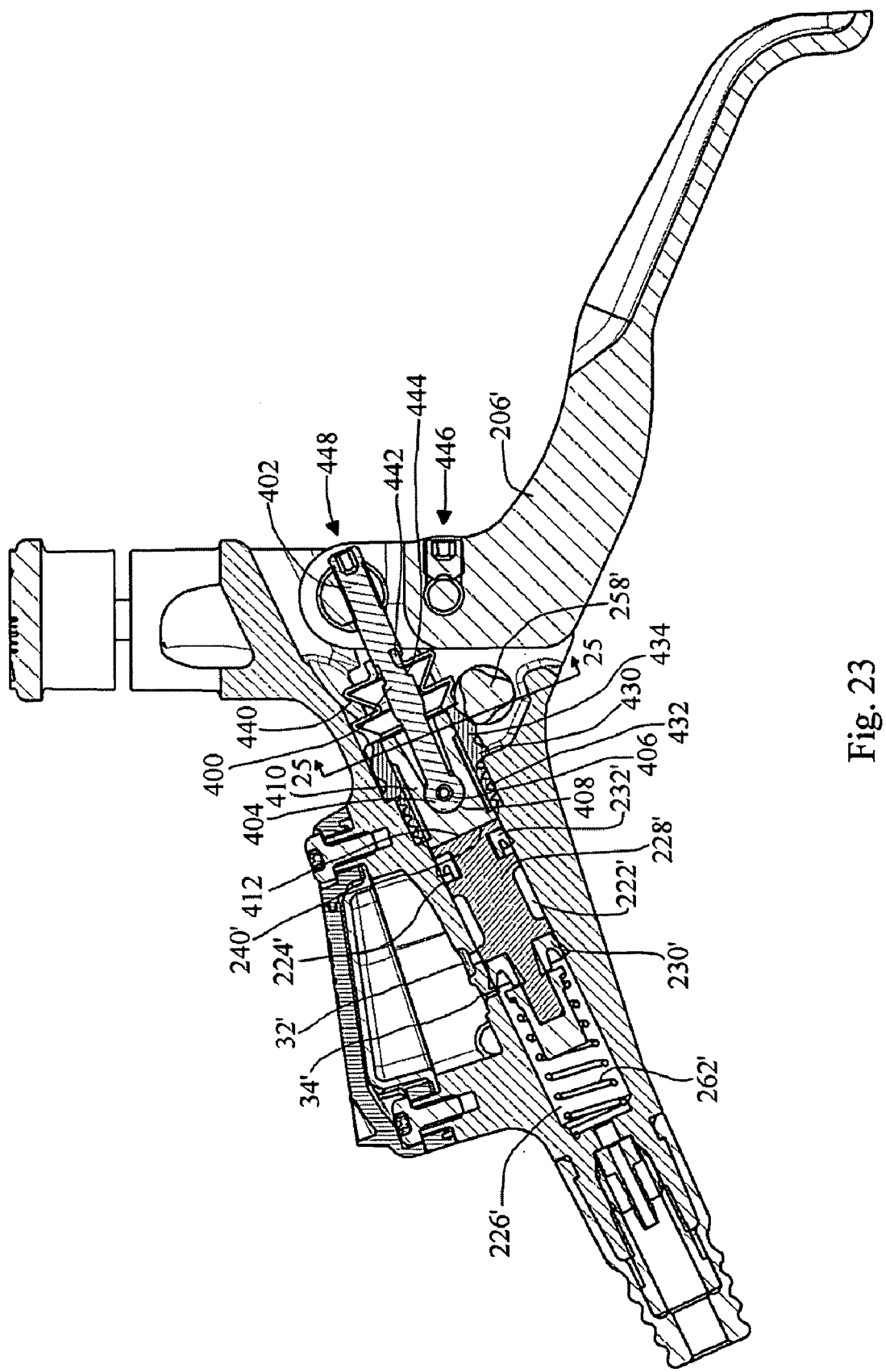
FIG. 23 is a cross-section of an alternate embodiment of the lever of FIG. 12.

FIG. 23 is a cross-section of an alternate embodiment of the drive train of a master cylinder. The piston and cylinder of the embodiment of FIG. 23 is essentially identical to that of the embodiment of FIG. 12, and like reference numbers followed by a prime (') are used for like elements and described above in detail with respect to FIG. 12. The primary difference in the structures begins to the right of the surface 240' in the trailing end of the piston 220, which in FIG. 23 is flat as opposed to a cup surface.

The embodiment of FIG. 23 has push rod 400 having a threaded portion 402 at a first end and head 404 at a second end. The head 404 has a bore receiving a pin 406 transverse the axis of the pushrod 400. The head 404 is received in a socket 408 within a piston coupling 410 having a leading flat surface 412 abutting the cup 240'. Referring to FIG. 24, the piston coupling 410 has axial slots 414 which receive the pins 406 to allow axial movement of the head 404 within the piston coupling 410, but prevent axial rotation of the push rod 400 relative to the piston coupling 410. The threaded portion 402 of the pushrod is threadably engaged with the lever handle 206' in the same manner discussed above with respect to the embodiment of FIG. 12, including the off-center coupling with the cross-dowel. The piston coupling 410 has an annular flange 416 with sinusoidal florets 418 extending radially therefrom. An externally threaded insert 430 has an externally threaded leading axial portion 432 and a trailing axial portion 434 having radially inclined gear teeth which are best viewed in FIG. 24. Threaded insert 430 further has an axial bore 436 having sinusoidal florets 438 configured to mate with the sinusoidal florets 418 of the piston coupling 410. An elastomeric annular wipe seal 440 having a nipple 442 received in an annular groove 444 of the push rod 400 abuts the threaded insert 430.

The lever of FIG. 23 also includes a worm 258' essentially identical to that of the embodiment discuss above with respect to FIG. 12 and which will not be re-described here. Likewise, the pivot assembly 446 is similar to that described with reference to FIG. 12.

The basic operation of the master cylinder of FIG. 23 is identical to that of the master cylinder lever 200 of FIG. 12 and this description will not be repeated. The embodiment of FIG. 23 shares the features of independent reach adjustment and a dead-band adjustment that compensates for and prevents change of the reach adjustment during dead-band adjustment and is not re-described here. The reach adjustment differs slightly from the embodiment discussed above with respect to FIG. 12. In the embodiment of FIG. 23, insertion of an Allen wrench into a hex socket 448 allows for reach adjustment. Axial rotation of the push rod by an Allen wrench will cause indexed axial rotation of the piston coupling 410 relative to the threaded insert 430. The threaded insert 430 is prevented from axial rotation by the worm 258'. The axial slots 414 allow disengagement and relative movement of the florets and axial rotation of the piston coupling 410 relative to the push rod 400 is prevented by the pins 406 received in the slots 414. In a preferred embodiment, each indexed rotation of the push rod causes a uniform movement of the lever end relative to the clamp axis (e.g., 1 mm). The mating florets are illustrated in FIG. 25 in a cross-section taken along line 25-25 of FIG. 23.

The embodiment of FIG. 23 also includes a feature to protect the piston train in the event of an accident causing movement of the lever handle 206 away from the clamp axis. In such an event, the head 404 of the push rod can axially disengage from the socket 408 of the piston coupling in a direction to the right. Once a user recovers from such a mishap, the lever can be simply returned to its normal rest position which will cause the head 404 to pop back into the socket 408.

The invention claimed is:

1. A method of varying a rest position and a length of an actuation arc of a lever in a hydraulic disc brake system, the hydraulic disc brake system comprising a master cylinder including a cylinder having a first end and second end and a port communicating with a hydraulic fluid reservoir between the first and the second cylinder ends, a piston received in the cylinder, the piston having a seal between the cylinder and the piston, the piston being movable within the cylinder by a lever operatively associated therewith to selectively pressurize hydraulic fluid within the cylinder by moving the seal between the port and the second end of the cylinder, the hydraulic disc brake system further comprising a caliper in fluid communication with the master cylinder, the caliper having a pair of brake pads operatively associated with a disc received therebetween, the caliper being actuated by movement of the lever in an actuation arc between a rest position and an engagement point with the pads in engagement with the disc, the length of the actuation arc being variable by movement of the engagement point relative to the rest position along the actuation arc, the method comprising:

varying a rest position of the lever independent of the actuation arc while simultaneously substantially maintaining the length of the actuation arc as the rest position of the lever is varied; and varying the length of the actuation arc while simultaneously substantially maintaining the rest position of the lever and limiting any movement of the piston seal to between the port and the first end of the cylinder as a result of the length of the actuation arc being varied.

* * * * *